United States Patent
Liu et al.

(10) Patent No.: US 11,011,177 B2
(45) Date of Patent: May 18, 2021

(54) VOICE IDENTIFICATION FEATURE OPTIMIZATION AND DYNAMIC REGISTRATION METHODS, CLIENT, AND SERVER

(71) Applicant: ALIBABA GROUP HOLDING LIMITED, Grand Cayman (KY)

(72) Inventors: Gang Liu, Seattle, WA (US); Qingen Zhao, Hangzhou (CN); Guangxing Liu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 268 days.

(21) Appl. No.: 16/008,828

(22) Filed: Jun. 14, 2018

(65) Prior Publication Data

US 2018/0366125 A1    Dec. 20, 2018

(30) Foreign Application Priority Data

Jun. 16, 2017    (CN) .......................... 201710461578.0

(51) Int. Cl.
| | |
|---|---|
| *G10L 17/02* | (2013.01) |
| *G10L 17/04* | (2013.01) |
| *G10L 17/06* | (2013.01) |
| *G10L 17/08* | (2013.01) |
| *G10L 15/08* | (2006.01) |
| *G10L 15/26* | (2006.01) |
| *G06F 21/32* | (2013.01) |

(52) U.S. Cl.
CPC .............. *G10L 17/04* (2013.01); *G10L 15/08* (2013.01); *G10L 17/02* (2013.01); *G10L 17/06* (2013.01); *G10L 17/08* (2013.01); *G10L 2015/088* (2013.01)

(58) Field of Classification Search
CPC ......... G10L 17/02; G10L 17/04; G10L 17/06; G10L 17/08; G06F 21/32
See application file for complete search history.

(56) References Cited

U.S. PATENT DOCUMENTS

| | | | |
|---|---|---|---|
| 6,016,476 | A | 1/2000 | Maes et al. |
| 6,213,391 | B1 | 4/2001 | Lewis |

(Continued)

FOREIGN PATENT DOCUMENTS

| | | |
|---|---|---|
| CN | 106782564 A | 5/2017 |
| JP | 2003-255991 A | 9/2003 |

(Continued)

OTHER PUBLICATIONS

International Search Report and Written Opinion for Application No. PCT/US2018/037591, dated Sep. 7, 2018, 8 pages.

(Continued)

*Primary Examiner* — Daniel C Washburn
*Assistant Examiner* — Oluwadamilola M Ogunbiyi

(57) ABSTRACT

A voice identification method comprises: obtaining audio data, and extracting an audio feature of the audio data; determining whether a voice identification feature having a similarity with the audio feature above a preset matching threshold exists in an associated feature library; and in response to determining that the voice identification feature exists in the associated feature library, updating, by using the audio feature, the voice identification feature obtained through matching.

16 Claims, 9 Drawing Sheets

(56) References Cited

U.S. PATENT DOCUMENTS

| | | | |
|---|---|---|---|
| 6,321,195 B1* | 11/2001 | Lee | G10L 15/10 |
| | | | 704/241 |
| 6,496,800 B1* | 12/2002 | Kong | G10L 17/24 |
| | | | 704/239 |
| 6,510,415 B1 | 1/2003 | Talmor et al. | |
| 6,601,762 B2 | 8/2003 | Piotrowski | |
| 6,748,356 B1* | 6/2004 | Beigi | G10L 17/04 |
| | | | 704/245 |
| 7,158,776 B1 | 1/2007 | Estes et al. | |
| 7,212,613 B2 | 5/2007 | Kim et al. | |
| 7,536,304 B2 | 5/2009 | Di Mambro et al. | |
| 7,657,431 B2 | 2/2010 | Hayakawa | |
| 7,716,055 B1 | 5/2010 | Mcintosh et al. | |
| 10,236,017 B1* | 3/2019 | Witt-Ehsani | G10L 15/26 |
| 10,515,638 B1* | 12/2019 | Whitmore | H04M 3/4936 |
| 2003/0182119 A1 | 9/2003 | Junqua et al. | |
| 2003/0198195 A1* | 10/2003 | Li | H04M 7/006 |
| | | | 370/260 |
| 2003/0220796 A1 | 11/2003 | Aoyama et al. | |
| 2004/0249650 A1* | 12/2004 | Freedman | G06Q 30/02 |
| | | | 705/7.29 |
| 2005/0043014 A1 | 2/2005 | Hodge | |
| 2005/0125226 A1 | 6/2005 | Magee | |
| 2006/0248019 A1 | 11/2006 | Rajakumar | |
| 2007/0185718 A1 | 8/2007 | Mambro et al. | |
| 2007/0219801 A1 | 9/2007 | Sundaram et al. | |
| 2007/0280436 A1 | 12/2007 | Rajakumar | |
| 2009/0119106 A1 | 5/2009 | Rajakumar et al. | |
| 2009/0319270 A1 | 12/2009 | Gross | |
| 2010/0004932 A1 | 1/2010 | Washio et al. | |
| 2010/0241433 A1 | 9/2010 | Herre et al. | |
| 2010/0280827 A1 | 11/2010 | Mukerjee et al. | |
| 2011/0288866 A1* | 11/2011 | Rasmussen | G10L 17/06 |
| | | | 704/246 |
| 2013/0054236 A1 | 2/2013 | Garcia Martinez et al. | |
| 2013/0103398 A1 | 4/2013 | Rauhala | |
| 2013/0232073 A1* | 9/2013 | Sheets | H04L 9/3231 |
| | | | 705/44 |
| 2013/0263227 A1* | 10/2013 | Gongaware | H04L 63/08 |
| | | | 726/4 |
| 2014/0163978 A1 | 6/2014 | Basye et al. | |
| 2014/0343943 A1* | 11/2014 | Al-Telmissani | G06F 21/32 |
| | | | 704/246 |
| 2015/0058016 A1 | 2/2015 | Goldstein | |
| 2015/0112680 A1* | 4/2015 | Lu | G10L 15/07 |
| | | | 704/244 |
| 2015/0161998 A1 | 6/2015 | Park et al. | |
| 2016/0093304 A1 | 3/2016 | Kim et al. | |
| 2016/0234204 A1* | 8/2016 | Rishi | H04L 63/0428 |
| 2016/0275952 A1* | 9/2016 | Kashtan | H04M 3/569 |
| 2016/0351185 A1* | 12/2016 | Lin | G10L 17/22 |
| 2017/0054779 A1* | 2/2017 | Ehmann | G06F 3/165 |
| 2017/0318013 A1* | 11/2017 | Roy | G06F 21/36 |
| 2018/0082691 A1* | 3/2018 | Khoury | G10L 17/02 |
| 2018/0144742 A1* | 5/2018 | Ye | G10L 17/04 |
| 2018/0190284 A1* | 7/2018 | Singh | G10L 15/22 |
| 2018/0261236 A1* | 9/2018 | Cao | G10L 15/063 |
| 2018/0359042 A1* | 12/2018 | Carroll | H04H 60/58 |
| 2019/0108839 A1* | 4/2019 | Reilly | G10L 15/20 |
| 2019/0206413 A1* | 7/2019 | Kikugawa | G10L 25/87 |
| 2020/0005760 A1* | 1/2020 | Tao | B60R 11/02 |

FOREIGN PATENT DOCUMENTS

| | | |
|---|---|---|
| JP | 2007-249179 A | 9/2007 |
| JP | 4847581 B | 12/2011 |
| JP | 2015-516091 A | 6/2015 |
| JP | 2015-175915 A | 10/2015 |
| JP | 2016-505888 A | 2/2016 |
| JP | 2016-540250 A | 12/2016 |

OTHER PUBLICATIONS

Office Action for European Application No. 18817311.6, dated Jun. 23, 2020, 5 pages.

Office Action for Japanese Application No. 2019-569451 dated Jan. 26, 2021.

* cited by examiner

VOICE IDENTIFICATION FEATURE OPTIMIZATION AND DYNAMIC REGISTRATION METHODS, CLIENT, AND SERVER

CROSS REFERENCE TO RELATED APPLICATION

The present application is based on and claims priority to Chinese Patent Application No. 201710461578.0, filed on Jun. 16, 2017, which is incorporated herein by reference in its entirety.

TECHNICAL FIELD

This application relates to the field of computer technologies, and in particular, to voice identification feature optimization and dynamic registration methods (voice identification methods), client, and server.

BACKGROUND

With the continuous development of artificial intelligence technologies, face identification and fingerprint identification technologies and the like have all been greatly improved. Intelligent identification is also applied more widely. Voiceprint identification as an innovative identification technology also has an increasingly fast development speed, and the voiceprint identification technology may also be referred to as speaker identification. The so-called voiceprint identification is an identification technology of extracting a speech feature from a speech of a speaker, and then performing identity verification based on the extracted speech feature.

The voiceprint identification depends on a feature gradually formed by a sound producing organ of a person in a development process, and voiceprints of all people are different, may be different in timbre, intonation, speaking speed, and the like, and may also be different in sound spectrum formed by a voice. Even if mimicking on purpose, voiceprints of different people are also different. Similar to fingerprints, different people have different voiceprints.

However, if identification is intended to be performed by using a voiceprint, a feature set for performing voiceprint matching needs to be established to achieve voiceprint identification.

For how to easily and efficiently establish an accurate feature library used for voiceprint identification, no effective solution has been put forward currently.

SUMMARY

Voice identification methods, client, and serve are disclosed, for easily and efficiently establishing a voice identification feature library having a relatively high precision.

According to one aspect, an optimization method for a voice identification feature is provided, where the method includes: obtaining audio data, and extracting an audio feature of the audio data; determining whether a voice identification feature having a similarity with the audio feature reaches a preset matching threshold exists in an associated feature library, where the associated feature library is used to store a voice identification feature of associated user information; and updating, by using the audio feature, a voice identification feature obtained through matching if it is determined that such voice identification feature exists; and adding the audio feature to an unassociated feature library if it is determined that such voice identification feature does not exist, where the unassociated feature library is used to store a voice identification feature of unassociated user information.

According to another aspect, a dynamic registration method for a voice identification feature is provided, where the method includes: determining whether a number of audios for updating a voice identification feature reaches a preset threshold; and associating user information with the voice identification feature if it is determined that the number of the audios for updating the voice identification feature reaches the preset threshold.

According to another aspect, a dynamic registration method for a voice identification feature is provided, where the method includes: determining whether a voice identification feature having a number of update times reaches a preset threshold exists in an unassociated feature library, where the unassociated feature library is used to store a voice identification feature of unassociated user information; and associating, if it is determined that a voice identification feature having a number of update times above the preset threshold exists in the unassociated feature library, user information with the voice identification feature, and adding the voice identification feature to an associated feature library, where the associated feature library is used to store a voice identification feature of associated user information.

According to another aspect, a dynamic registration method for a voice identification feature is provided, where the method includes: determining whether a voice identification feature satisfies a preset requirement; and associating user information with the voice identification feature if it is determined that the voice identification feature satisfies the preset requirement.

According to another aspect, a client is provided, including: a processor and a memory, where the processor is configured to obtain audio data, and extract an audio feature of the audio data; determine whether a voice identification feature having a similarity with the audio feature reaches a preset matching threshold exists in an associated feature library, where the associated feature library is used to store a voice identification feature of associated user information; and update, by using the audio feature, a voice identification feature obtained through matching if it is determined that such voice identification feature exists; and add the audio feature to an unassociated feature library if it is determined that such voice identification feature does not exist, where the unassociated feature library is used to store a voice identification feature of unassociated user information; and the memory is configured to store the associated feature library and the unassociated feature library.

According to another aspect, a server is provided, including: a processor and a memory, where the processor is configured to obtain audio data, and extract an audio feature of the audio data; determine whether a voice identification feature having a similarity with the audio feature reaches a preset matching threshold exists in an associated feature library, where the associated feature library is used to store a voice identification feature of associated user information; and update, by using the audio feature, a voice identification feature obtained through matching if it is determined that such voice identification feature exists; and add the audio feature to an unassociated feature library if it is determined that such voice identification feature does not exist, where the unassociated feature library is used to store a voice identification feature of unassociated user information; and the memory is configured to store the associated feature library and the unassociated feature library.

According to another aspect, a client is provided, including a processor, where the processor is configured to perform the following steps: determining whether a number of audios for updating a voice identification feature reaches a preset threshold; and associating user information with the voice identification feature if it is determined that the number of the audios for updating the voice identification feature reaches the preset threshold.

According to another aspect, a server is provided, including a processor, where the processor is configured to perform the following steps: determining whether a number of audios for updating a voice identification feature reaches a preset threshold; and associating user information with the voice identification feature if it is determined that the number of the audios for updating the voice identification feature reaches the preset threshold.

According to another aspect, a processing method for a voice identification feature is provided, where the method includes: obtaining audio data, and extracting an audio feature of the audio data; determining whether a stored voice identification feature matching the audio feature exists; and updating the stored voice identification feature by using the audio feature if it is determined that such voice identification feature exists; or creating a new user profile for the audio feature if it is determined that such voice identification feature does not exist, and associating the new user profile with the audio feature.

According to another aspect, an electronic device is provided, including: a microphone unit and a network communications unit, where the microphone unit is configured to obtain audio data; the network communications unit is configured to send the audio information to a server, so that the server extracts an audio feature of the audio data; determines whether a voice identification feature having a similarity with the audio feature reaches a preset matching threshold exists in an associated feature library, where the associated feature library is used to store a voice identification feature of associated user information; and updates, by using the audio feature, a voice identification feature obtained through matching if it is determined that such voice identification feature exists; and adds the audio feature to an unassociated feature library if it is determined that such voice identification feature does not exist, where the unassociated feature library is used to store a voice identification feature of unassociated user information.

According to another aspect, an electronic device is provided, including: a microphone unit, a network communications unit, and a processor, where the microphone unit is configured to obtain audio data; the processor is configured to extract an audio feature of the audio data; and the network communications unit is configured to send the audio feature to a server, so that the server determines whether a voice identification feature having a similarity with the audio feature reaches a preset matching threshold exists in an associated feature library, where the associated feature library is used to store a voice identification feature of associated user information; and updates, by using the audio feature, a voice identification feature obtained through matching if it is determined that such voice identification feature exists; and adds the audio feature to an unassociated feature library if it is determined that such voice identification feature does not exist, where the unassociated feature library is used to store a voice identification feature of unassociated user information.

A computer readable storage medium is provided, storing a computer program that, when executed by a processor, implements steps of the foregoing methods.

According to another aspect, a voice identification method comprises: obtaining audio data, and extracting an audio feature of the audio data; determining whether a voice identification feature having a similarity with the audio feature above a preset matching threshold exists in an associated feature library; and in response to determining that the voice identification feature exists in the associated feature library, updating, by using the audio feature, the voice identification feature.

In some embodiments, the updating, by using the audio feature, a voice identification feature comprises: generating a first identification feature according to the audio feature and the voice identification feature; and replacing the voice identification feature with the first identification feature, and storing the first identification feature in the associated feature library.

In some embodiments, the in response to determining that the voice identification feature exists in the associated feature library, updating, by using the audio feature, the voice identification feature comprises: in response to determining that a plurality of the voice identification features of the associated user information having similarities with the audio feature above the preset matching threshold exist in the associated feature library, updating, by using the audio feature, the voice identification feature of the associated user information having the highest similarity with the audio feature.

In some embodiments, the audio data comprises an audio recording of a wakeup keyword spoken by a user.

In some embodiments, the method further comprises: in response to determining that the voice identification feature does not exist in the associated feature library, searching an unassociated feature library to determining if the voice identification feature having the similarity with the audio feature above the preset matching threshold exists in the unassociated feature library, wherein the associated feature library stores voice identification features of associated user information, and the unassociated feature library stores voice identification features of unassociated user information.

In some embodiments, the associated feature library further stores user information associated with the voice identification feature of the associated user information; and the unassociated feature library further stores a number of audios for updating the voice identification feature of the unassociated user information.

In some embodiments, the method further comprises: in response to determining that the voice identification feature having the similarity with the audio feature above the preset matching threshold exists in the unassociated feature library, updating, by using the audio feature, the voice identification feature, and updating a number of audios for updating the voice identification feature; and in response to determining that the voice identification feature having the similarity with the audio feature above the preset matching threshold does not exist in the unassociated feature library, adding the audio feature as the voice identification feature to the unassociated feature library.

In some embodiments, the method further comprises: monitoring whether a number of the voice identification features of the unassociated user information exceeds a preset number; and in response to determining that the number of the voice identification features of the unassociated user information exceeds the preset number, deleting one or more of the voice identification features of the unassociated user information having the least amount of audio data for updating the one or more voice identification features.

In some embodiments, the method further comprises: monitoring whether a number of the voice identification features of the unassociated user information exceeds a preset number; and in response to determining that the number of the voice identification features of the unassociated user information exceeds the preset number, deleting one or more of the voice identification features of the unassociated user information having the earliest update time.

In some embodiments, the method further comprises: monitoring whether a number of the voice identification features of the unassociated user information exceeds a preset number; in response to determining that the number of the voice identification features of the unassociated user information does not exceed the preset number, searching the unassociated feature library to determine whether a number of audios for updating any of the voice identification features of the unassociated user information reaches a preset threshold; in response to determining that a number of audios for updating a first voice identification features of the unassociated user information reaches a preset threshold, comparing the first voice identification feature with the voice identification features in the associated feature library; in response to determining the first voice identification feature is dissimilar to the voice identification features in the associated feature library, adding the first voice identification feature to the associated feature library and record information of a user corresponding to the audio data; and in response to determining the first voice identification feature is similar to a second voice identification features in the associated feature library, updating, by using the first voice identification feature, the second voice identification feature.

In some embodiments, the method further comprises: in response to determining that the voice identification feature does not exist in the associated feature library, determining whether a number of audios for updating the voice identification feature reaches a preset threshold; and associating user information with the voice identification feature in response to determining that the number of the audios for updating the voice identification feature reaches the preset threshold.

According to another aspect, a non-transitory computer-readable storage medium storing instructions that, when executed by a processor, cause the processor to perform a voice identification method, the method comprising: extracting an audio feature of audio data; determining whether a voice identification feature having a similarity with the audio feature above a preset matching threshold exists in an associated feature library; and in response to determining that the voice identification feature exists in the associated feature library, updating, by using the audio feature, the voice identification feature.

According to another aspect, a voice identification system, comprising a microphone configured to obtain audio data; and a processor and a non-transitory computer-readable storage medium storing instructions that, when executed by the processor, cause the system to perform a voice identification method, the method comprising: extracting an audio feature of the audio data; determining whether a voice identification feature having a similarity with the audio feature above a preset matching threshold exists in an associated feature library; and in response to determining that the voice identification feature exists in the associated feature library, updating, by using the audio feature, the voice identification feature.

In above examples, if it is determined that a number of audios for updating a voice identification feature exceeds a preset threshold, user information associated with the voice identification feature is added to the voice identification feature. That is, if it is determined that a voice identification feature may be used to represent a voice characteristic of a user, user information may be associated with the voice identification feature, thereby associating the user information with the voice identification feature, so as to automatically establish and update a voiceprint library. The disclosed methods and systems can achieve a technical effect of easily and efficiently establishing an accurate feature library used for voiceprint identification.

BRIEF DESCRIPTION OF THE DRAWINGS

To illustrate the technical solutions in the implementations of this disclosure more clearly, the accompanying drawings are briefly described in the following. Apparently, the accompanying drawings in the following descriptions merely show some of the implementations of this disclosure, and people of ordinary skill in the art may still derive other drawings from the accompanying drawings without creative efforts.

DETAILED DESCRIPTION

To make the technical solutions of this application more comprehensible for people skilled in the art, the technical solutions in the implementations of this application are clearly and completely described in the following with reference to the accompanying drawings. Apparently, the implementations to be described are merely a part rather than all of the implementations. All other implementations obtainable by people of ordinary skill in the art based on the disclosed implementations without making creative efforts shall fall within the protection scope of the present disclosure.

In a conventional method for establishing a voiceprint library, generally, after an identity of a user is learned, the user is informed to input audio data (may also be referred to as speech data) of the user, and then an audio feature in the audio data is extracted as a voice identification feature of the user, thereby implementing an association between the identity of the user and the voice identification feature of the user.

However, this manner mainly has the following several problems:

1) The implementation process is relatively complex, requiring to not only inform the user to perform input, but also wait for the user to perform input based on the notification message, and is implemented relatively cumbersomely.

2) The implementation scenario is relatively rigid, requiring the user to perform triggering in a particular triggering environment, and registration can only be implemented at a particular time only after the triggering.

3) The voice identification feature is not accurate, and because user passive entry is used, the number of entry times is generally limited. For example, only three pieces of speech data of the user are obtained, and the sample number is excessively small, so that a generated identification feature is not accurate. If the sample number needs to be increased, the user has to perform entry for more times, which lowers the user experience.

4) The intelligence level is relatively low, that is, the user needs to fully participate in the entire registration process, and the establishment of the voice identification library is inadequately intelligent.

Figure 1:
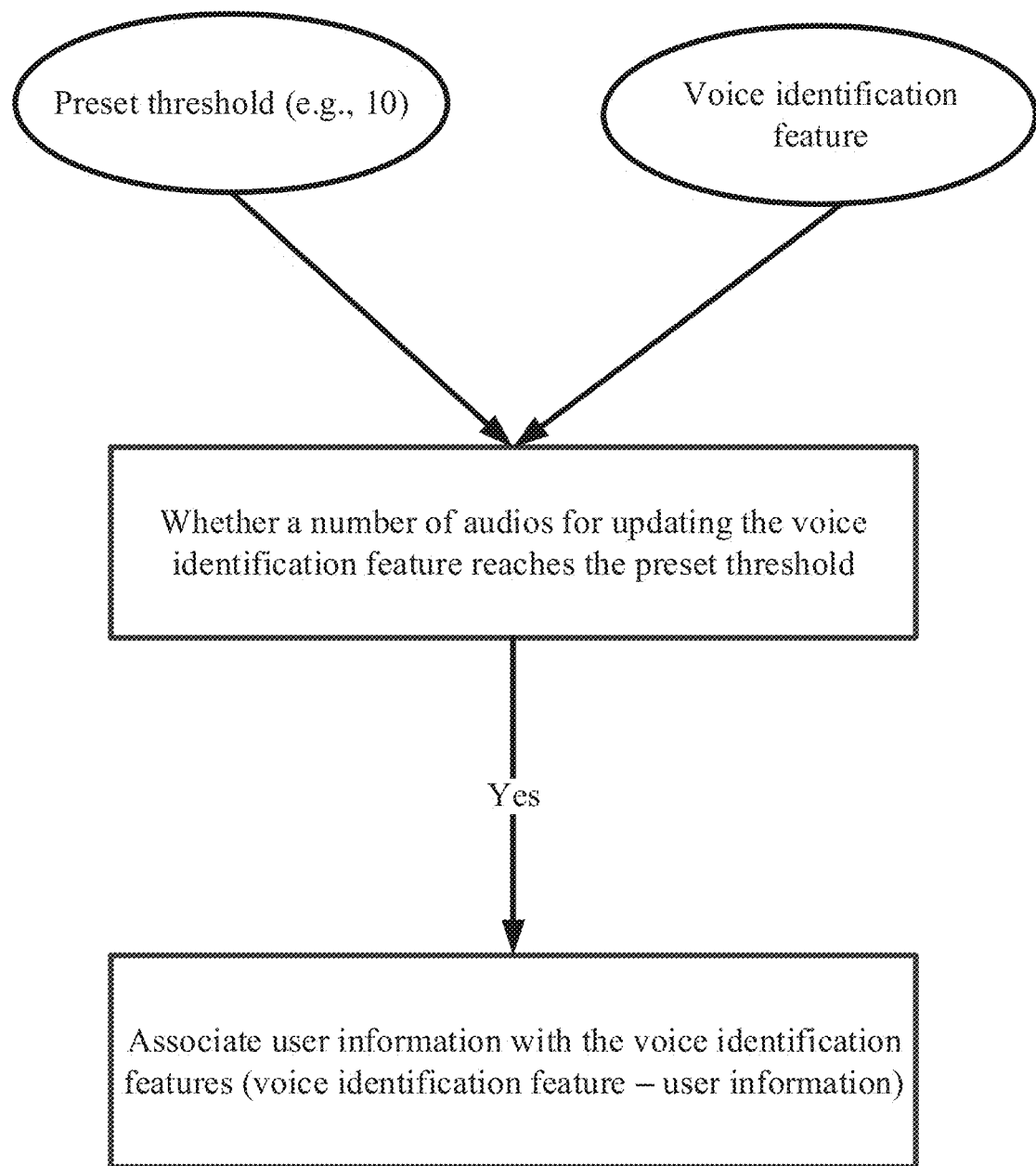
FIG. 1 is a flowchart of a data update method according to various embodiments of the present disclosure.

To mitigate or resolve the foregoing existing problems, a dynamic registration method for a voice identification feature is disclosed. Audio data is obtained, and an audio feature of the audio data is automatically extracted and recorded. If it is determined that a speech identification feature satisfies a preset requirement, the speech identification feature is associated with user information, so as to establish and update a voice identification feature library. As shown in FIG. 1, a dynamic voice identification feature registration method is provided. If it is determined that a number of audios for updating a voice identification feature reaches a preset threshold, user information is associated with the voice identification feature.

That is, in some embodiments, audio data may be obtained. If it is determined that the audio data is from an unregistered user (that is, has not performed user information association with a voiceprint of the user), whether a number of update times of a voice identification feature similar to the audio data reaches a preset requirement is determined. If the number reaches a preset number of times, it may be determined that the voice identification feature can relatively accurately identify the voice of the user. In this case, the association between the voice identification feature and the user may be triggered, thereby achieving an automatic registration objective, and resolving the existing problem that the user needs to fully participate in information entry of a voiceprint library.

Additionally, in this example, a voice identification method is further provided. This method comprises the following: after audio data is obtained and an audio feature is extracted, a voiceprint similar to the audio feature is found, and the voiceprint is already associated with user information, that is, the owner of the audio data already performs voiceprint registration. In this case, a voice identification feature (that is, voiceprint) obtained through matching may be updated by using the audio feature. For example, the extracted audio feature and the voice identification feature obtained through matching are acquired, then a first identification feature is generated according to the audio feature and the voice identification feature obtained through matching, and the voice identification feature obtained through matching is replaced with the first identification feature serving as a voiceprint of the user, so as to implement voiceprint update. In an implementation, in a process of generating the first identification feature according to the audio feature and the voice identification feature obtained through matching, the first identification feature may be generated in a method of performing weighted averaging on the extracted audio feature and the voice identification feature obtained through matching or another method. By using the above method, precision and identification accuracy of the voice identification feature in the voiceprint library may be improved.

In some embodiments, the foregoing process of voice identification feature optimization and voice identification feature dynamic registration may include: extracting an audio feature of obtained audio data, and then performing matching between an audio feature obtained each time and a voice identification feature of associated user information. If a voice identification feature of associated user information whose similarity with the audio feature exceeds a preset matching threshold exists, it indicates that the audio feature of the audio data and the voice identification feature of the associated user information are from the same person. Therefore, the voice identification feature obtained through matching may be updated by using the audio feature of the audio data. If a voice identification feature of the associated user information whose similarity with the audio feature reaches the preset matching threshold does not exist, whether a voice identification feature of unassociated user information whose similarity with the audio feature reaches the preset matching threshold exists may be further determined. If it is determined that a voice identification feature of the unassociated user information whose similarity with the audio feature reaches the preset matching threshold exists, the voice identification feature of the unassociated user information obtained through matching may be updated by using the audio feature.

In some embodiments, a voice identification method comprises: obtaining audio data, and extracting an audio feature of the audio data; determining whether a voice identification feature having a similarity with the audio feature above a preset matching threshold exists in an associated feature library; and in response to determining that the voice identification feature exists in the associated feature library, updating, by using the audio feature, the voice identification feature. This method may be implemented by a voice identification system (e.g., server, client), for example, by software codes stored in a storage medium on the voice identification system.

In some embodiments, the method further comprises: in response to determining that the voice identification feature does not exist in the associated feature library, searching an unassociated feature library to determining if the voice identification feature having the similarity with the audio feature above the preset matching threshold exists in the unassociated feature library, wherein the associated feature library stores voice identification features of associated user information, and the unassociated feature library stores voice identification features of unassociated user information.

In some embodiments, the method further comprises: in response to determining that the voice identification feature having the similarity with the audio feature above the preset matching threshold exists in the unassociated feature library, updating, by using the audio feature, the voice identification feature, and updating a number of audios for updating the voice identification feature; and in response to determining that the voice identification feature having the similarity with the audio feature above the preset matching threshold does not exist in the unassociated feature library, adding the audio feature as the voice identification feature to the unassociated feature library.

In some embodiments, the method further comprises: monitoring whether a number of the voice identification features of the unassociated user information exceeds a preset number; in response to determining that the number of the voice identification features of the unassociated user information does not exceed the preset number, searching the unassociated feature library to determine whether a number of audios for updating any of the voice identification features of the unassociated user information reaches a preset threshold; in response to determining that a number of audios for updating a first voice identification features of the unassociated user information reaches a preset threshold, comparing the first voice identification feature with the voice identification features in the associated feature library; in response to determining the first voice identification feature is dissimilar to the voice identification features in the associated feature library, adding the first voice identification feature to the associated feature library and record information of a user corresponding to the audio data; and in response to determining the first voice identification feature is similar to a second voice identification features in the associated feature library, updating, by using the first voice identification feature, the second voice identification feature.

In some embodiments, the method further comprises: in response to determining that the voice identification feature does not exist in the associated feature library, determining whether a number of audios for updating the voice identification feature reaches a preset threshold; and associating user information with the voice identification feature in response to determining that the number of the audios for updating the voice identification feature reaches the preset threshold.

By using the foregoing manner, the audio feature extracted from the currently collected audio data may be updated to the voice identification feature of the associated user information, or updated to the voice identification feature of the unassociated user information. If a voice identification feature similar to the audio feature does not exist in the voice identification feature of the associated user information and does not exist in the voice identification feature of the unassociated user information, the audio feature may be used as a new voice identification feature of the unassociated user information.

In some embodiments, for a voice identification feature of the unassociated user information, if a number of audios for updating this feature already reaches or exceeds a predetermined number of times, it may be considered that the current voice identification feature of the unassociated user information may be used to relatively accurately identify the user identity. In this case, an association between user information and the voice identification feature of the unassociated user information may be triggered, so that the voice identification feature of the unassociated user information may be used to determine the identity. To trigger the association between user information and the voice identification feature of the unassociated user information, each voice identification feature of the unassociated user information may be periodically determined, to determine a voice identification feature of the unassociated user information whose number of update times reaches a preset threshold. User information is associated with a voice identification feature of the unassociated user information whose number of update times reaches the preset threshold. Real-time dynamic update may also be performed. For example, once it is detected that the current audio feature is for updating a voice identification feature of the unassociated user information, and a number of update times of the voice identification feature of the unassociated user information reaches the preset threshold (for example: 6 times), the association between user information and the voice identification feature of the unassociated user information may be triggered.

In some embodiments, a plurality of voice identification features of the associated user information whose similarities with the audio feature reach the preset matching threshold exist. Then, a voice identification feature of the associated user information having the highest similarity with the audio feature may be selected, and the voice identification feature of the associated user information having the highest similarity with the audio feature is updated by using the audio feature. Likewise, a plurality of voice identification features of the unassociated user information whose similarities with the audio feature reach the preset matching threshold may also be obtained through matching, and a voice identification feature of the unassociated user information having the highest similarity with the audio feature is updated by using the audio feature.

In some embodiments, the audio data may be recorded by a sound recording device for a certain period of time, or recorded by the sound recording device for a certain size.

In some embodiments, an audio feature may be extracted from audio data according to a preset algorithm, and the voice of the user has features of the user, such as a timbre, an intonation, and a speaking speed. When an audio file is recorded, voice features of each user may be embodied in terms of frequency, amplitude, or the like in the audio data. Therefore, the audio feature is obtained from the audio data according to the preset algorithm, where the preset algorithm may be MFCC (Mel Frequency Cepstrum Coefficient), MFSC (Mel Frequency Spectral Coefficient), FMFCC (Fractional Mel Frequency Cepstrum Coefficient), DMFCC (Discriminative Mel Frequency Cepstrum Coefficient), LPCC (Linear Prediction Cepstrum Coefficient), or the like. A person skilled in the art may further extract the audio feature from the audio data by using other algorithms, but as long as functions and effects implemented by the algorithms are the same as or similar to those of the disclosed method, the algorithms should all fall within the protection range of this disclosure.

In some embodiments, to further distinguish between audio data of a user speech and audio data of a non-user speech in the audio file, in the process of extracting the audio feature, endpoint detection processing may be further included. Then, data corresponding to the audio data of the non-user speech may be reduced in the audio feature. In this way, the degree of association between the generated audio feature and the user may be improved to some extent. Endpoint detection processing methods may include but are not limited to endpoint detection based on energy, endpoint detection based on cepstral feature, endpoint detection based on information entropy, and endpoint detection based on distance of auto-correlated similarity, and are not listed herein again.

In some embodiments, as the audio data to be identified increases, voice identification features of the unassociated user information also increase. To prevent excessive voice identification features of the unassociated user information from causing an excessively large calculation amount or an excessively large storage amount, a threshold of a number of voice identification features of the unassociated user information may be set. If it is detected that the number of voice identification features of the unassociated user information exceeds the preset number, some voice identification features of the unassociated user information may be deleted. During implementation, one or more of the voice identification features of the unassociated user information having the least amount of audio data for updating the one or more voice identification features may be deleted, or one or more of the voice identification features of the unassociated user information having the earliest update time may be deleted.

For example, a voice identification feature updated only once may be deleted, indicating that the user was active for a relatively small number of times, is not quite important or is not quite necessary, and therefore, may be deleted. Alternatively, voice identification feature updated earliest may be deleted. That is, for users inactive for a long time, voice identification features of these people may be deleted.

However, the foregoing listed selection of a to-be-deleted voice identification feature of the unassociated user information is only a schematic description. During implementation, another selection manner may be selected according to needs, and this is not limited in this disclosure.

In some embodiments, the foregoing audio data may be client audio data collected by using a client. In this implementation, the client may be an electronic device having a sound recording function. For example, the client may be a desktop computer, a tablet computer, a notebook computer, a smartphone, a digital assistant, a smart wearable device, a shopping guide terminal, a television set, a smart sound box, a microphone, or the like. The smart wearable device includes but is not limited to a smart band, a smart watch, smart glasses, a smart helmet, a smart necklace, or the like. Alternatively, the client may comprise a software that can be run in the electronic device. For example, the electronic device provides a sound recording function, and a software may record the audio data by invoking the sound recording function.

In some embodiments, if it is determined that the number of audios for updating a voice identification feature reaches the preset threshold, user information is associated with the voice identification feature. If it is determined that the number of audios for updating a voice identification feature reaches the preset threshold, a request for inputting personal information is sent to the user. For example, a speech or text reminder "please input your personal information" may be used. In response to the request, the user may input personal information in a speech manner, or may input personal information in a text input manner; or an interface may be provided, a plurality of input boxes is displayed on the interface, information input by the user into these input boxes is received and used as the user information of the user.

However, the foregoing manner of obtaining the user information is only a schematic description. During actual implementation, the user information may be further obtained in another manner. After the user information is obtained, the voice identification feature may be associated with the user information.

In some embodiments, the user information may include but is not limited to at least one of the following: a user name, a nickname, a real name, a gender, a contact phone number, a mailing address, and the like. The voice identification feature is associated with the user information. In this way, during application, after audio data of a user speech is collected, matching between an audio feature extracted from the audio data and a voice identification feature may be performed, so as to identify the user identity.

In some embodiments, the client may send recorded audio data or an audio feature identified from the audio data to a server, and if the server determines that a number of audios for updating a voice identification feature reaches the preset threshold, the user information is associated with the voice identification feature. Alternatively, the client extracts an audio feature from the audio data, and updates a voice identification feature by using the extracted audio feature, and if a number of audios for updating a voice identification feature reaches the preset threshold, the user information is associated with the voice identification feature.

In some embodiments, the server may be an electronic device having a calculation processing capability. The server may comprise a network communications terminal, a processor, a memory, and the like. The server may also comprise a software that is run in the electronic device. The server may further be a distributed server, and may be a system having a plurality of processors, a memory, a network communications module, and the like that are in coordinated operation. Alternatively, the server may further be a server cluster formed by several servers.

To distinguish between a voice identification feature of the associated user information and a voice identification feature of the unassociated user information, two databases: an associated feature library and an unassociated feature library may be set. The associated feature library is used to store the voice identification feature of the associated user information, and the unassociated feature library is used to store the voice identification feature of the unassociated user information. The associated feature library and the unassociated feature library may each be implemented on one or more memories, or may share a memory. This is not limited in this disclosure, as long as a storage division manner may distinguish between a voice identification feature of the associated user information and a voice identification feature of the unassociated user information.

Figure 2:
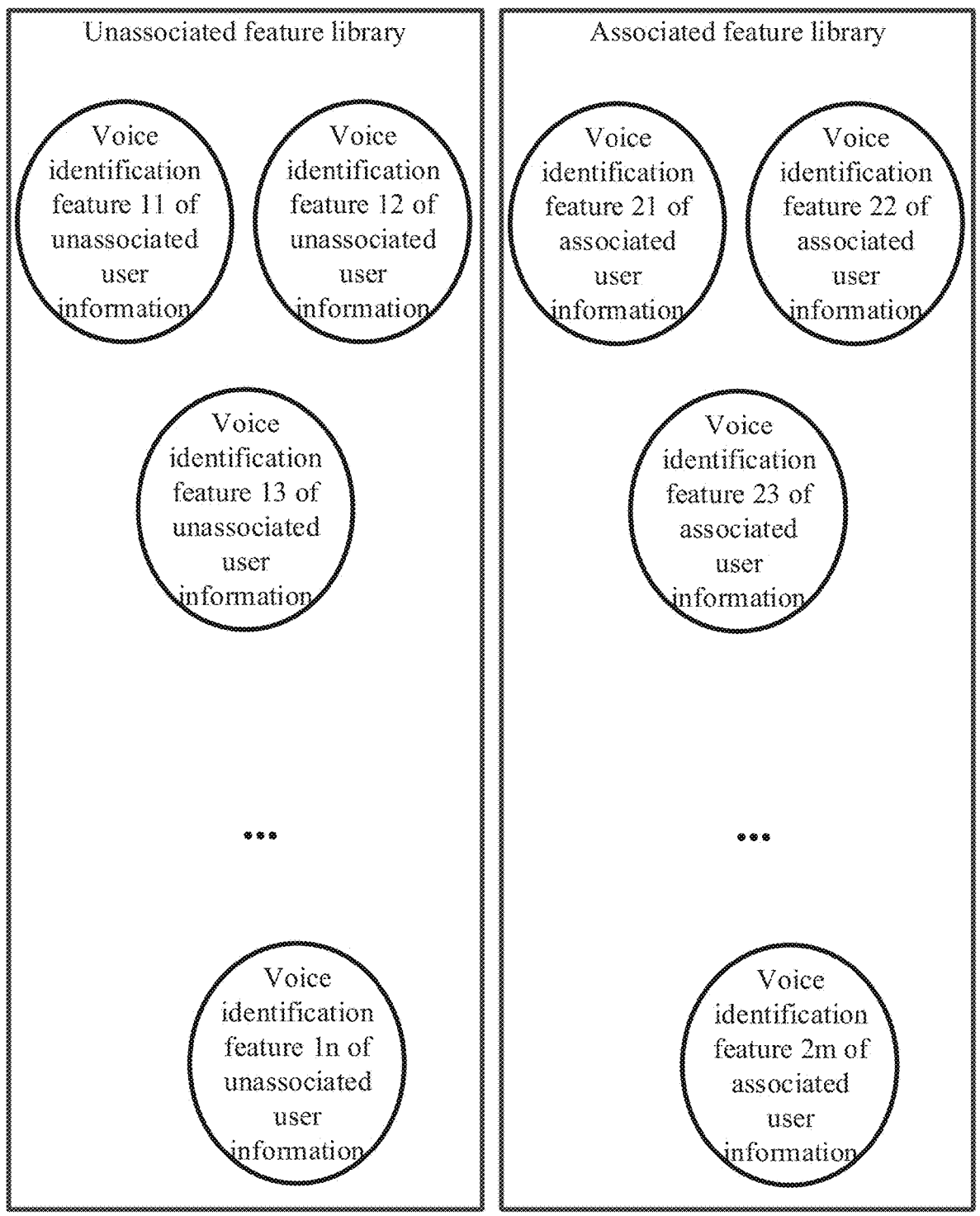
FIG. 2 is a schematic diagram of an unassociated feature library and an associated feature library according to various embodiments of the present disclosure.

After the associated feature library and the unassociated feature library are established, the voice identification feature of the associated user information may be stored in the associated feature library, and the voice identification feature of the unassociated user information may be stored in the unassociated feature library according to the manner shown in FIG. 2.

Figure 3:
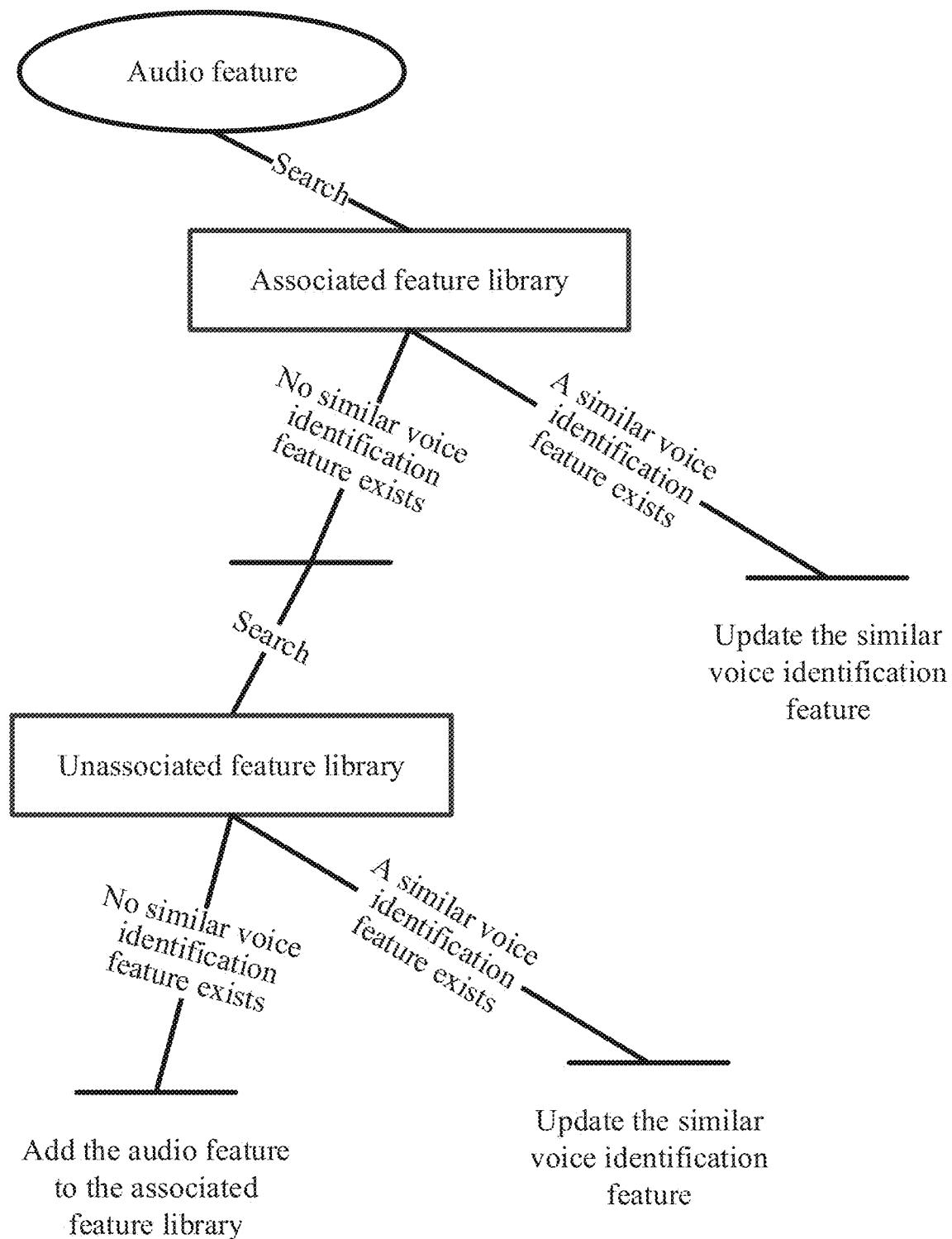
FIG. 3 is another flowchart of a data update method according to various embodiments of the present disclosure.

Correspondingly, when a data update process is performed, matching may be first performed in the associated feature library, and if the matching is not successful, another matching is performed in the unassociated feature library. For example, the process may be shown in FIG. 3:

obtaining audio data, and extracting an audio feature of the audio data;

1) updating, by using the audio feature if a voice identification feature whose similarity with the audio feature reaches the preset matching threshold exists in the associated feature library, a voice identification feature obtained through matching; or 2) adding, if a voice identification feature whose similarity with the audio feature reaches the preset matching threshold does not exist in the associated feature library, the audio feature to the unassociated feature library. Step 2) may proceed to step 2-1) or 2-2).

2-1) updating, by using the audio feature if a voice identification feature whose similarity with the audio feature reaches the preset matching threshold exists in the unassociated feature library, a voice identification feature obtained through matching, and updating a number of audios for updating the voice identification feature; or 2-2) adding, if a voice identification feature whose similarity with the audio feature reaches the preset matching threshold does not exist in the unassociated feature library, the audio feature serving as a voice identification feature to the unassociated feature library.

In some embodiments, a database may store a voice identification feature of the associated user information. Only a relatively small storage space needs to be set for the unassociated database. If excessive voice identification features of the associated user information are stored, deletion may be performed. During deletion, if a number of voice identification features in the unassociated feature library exceeds the preset number, one or more voice identification features that are in the unassociated feature library having the least amount of audio data for updating the one or more voice identification features are deleted, or one or more voice identification features that are in the unassociated feature library having the earliest update time are deleted. The method used may be determined according to an actual need, the number of voice identification features that are deleted may also be determined according to an actual need, and this is not limited in this disclosure.

In some embodiments, after audio data on which matching is performed is obtained and an audio feature of the audio data is extracted, matching is first performed in the associated feature library, and if the matching is not successful, another matching is performed in the unassociated feature library. However, a person's voice may change sometimes, for example, due to cold, fever, or the like. Thus, even though a voice identification feature of a user is already actually stored in the associated feature library, when similarity matching is performed, because the audio feature of the changed voice due to cold or fever has no associated similar voice identification feature of the associated user information in the associated feature library, the audio feature is placed in the unassociated feature library. Nevertheless, when the sample number is relatively large, a voice identification feature of the unassociated user information obtained through update based on these samples is relatively similar to an audio feature normally generated by the user. To prevent the same user information from being repetitively entered in the associated feature library, if a voice identification feature of the unassociated user information in the unassociated feature library satisfies a condition of being placed into the associated feature library, the voice identification feature is first compared with existing voice identification features in the associated feature library, to determine whether a similar voice identification feature of the associated user information exists. If yes, the similar voice identification feature of the associated user information obtained through matching is updated by using the voice identification feature satisfying the condition. If not, the voice identification feature satisfying the condition is associated with a piece of user information. The method overcomes the problem that a voice feature changes because of a body reason, and consequently the same user corresponds to a plurality of voice identification features.

Figure 4:
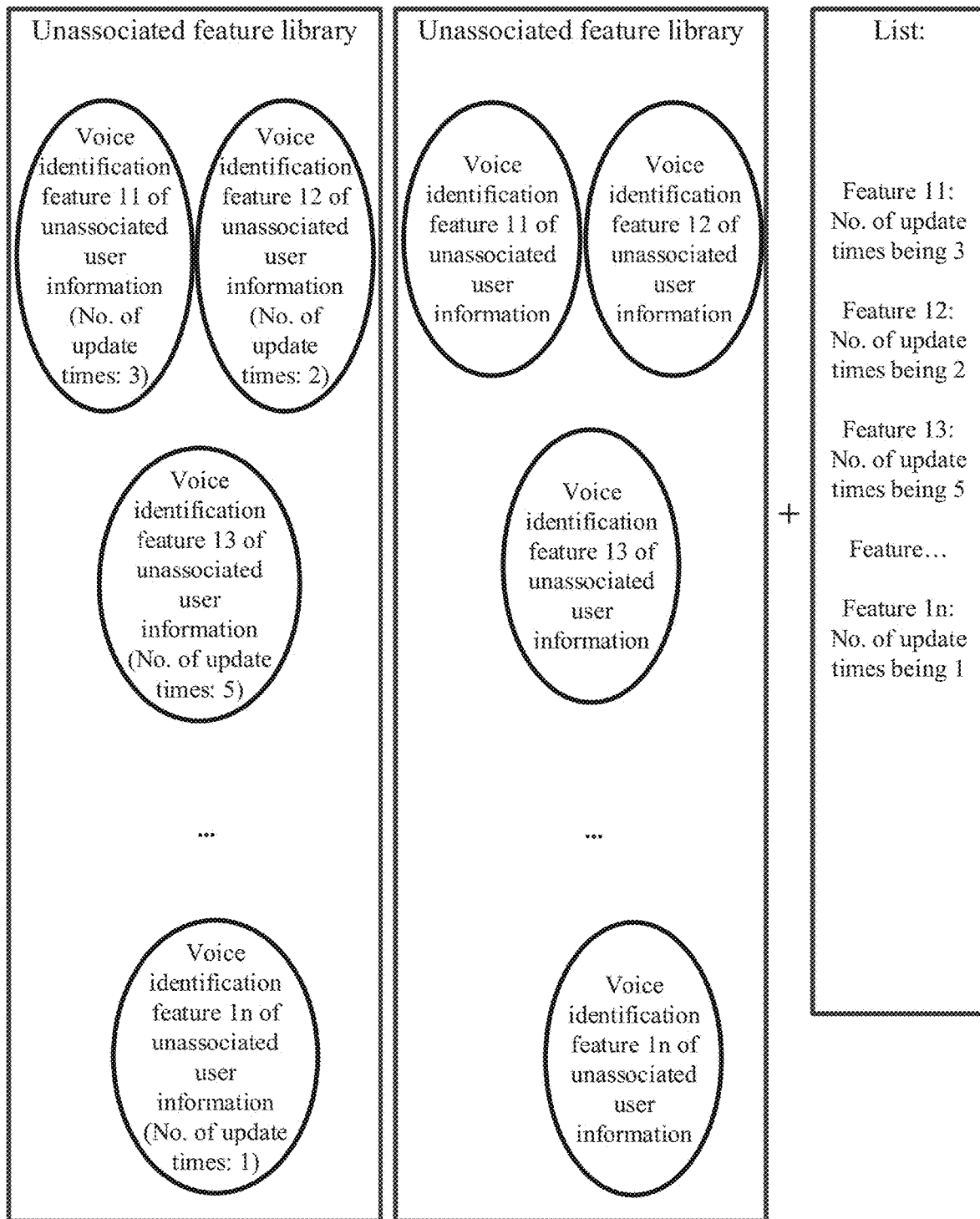
FIG. 4 is a schematic diagram of identification of a number of update times of each feature in an unassociated feature library according to various embodiments of the present disclosure.

In this example, as shown in FIG. 4, for each voice identification feature of the unassociated user information in the unassociated feature library, a number of update times is set and recorded. At each time being updated, a number of update times of a corresponding voice identification feature of the unassociated user information is increased by one. In this way, it may be convenient to determine whether the number of update times satisfies the preset threshold. During implementation, as shown in FIG. 4, recording is directly performed in the unassociated feature library, or a storage table may be independently set, to store the number of update times of each voice identification feature of the unassociated user information, which is not limited in this disclosure.

The foregoing describes data update, and the method may be applied to a plurality of scenarios. For example:

1) The client extracts an audio feature from audio data, and then transfers the audio data to a server side (which may also be a cloud side), and the server side (or cloud side) updates the data according to the audio feature.

2) The client locally maintains a database, and processes of extracting an audio feature from audio data and updating the data by using the extracted audio feature are both implemented by the client. The updated data may be synched to a server side or a cloud side, or may not be synched, which is not limited in this disclosure.

3) The client may directly send audio data to a server side or cloud side, the server side performs operations of extracting an audio feature and updating the data, and the client performs a process of obtaining data and information.

The foregoing merely describes some scenarios. During actual implementations, an execution body of each step may be selected according to an actual need. For example, processes of extracting a feature and updating data may be both implemented at the client, and obtaining data by using the server and the like may be conceived.

In some embodiments, no library may be established. Instead, by creating a new user profile for a voice identification feature, a user profile is associated with a corresponding audio feature or voice identification feature. For example, audio data is obtained, and an audio feature of the audio data is extracted. Whether a stored voice identification feature matching the audio feature exists is determined. If it is determined that such voice identification feature exists, the stored voice identification feature is updated by using the audio feature; and if it is determined that such voice identification feature does not exist, a new user profile is created for the audio feature, and the new user profile is associated with the audio feature. That is, if an audio feature is obtained, whether a stored voice identification feature matching the audio feature or a voice identification feature for which a user profile is already established exists is first determined. If yes, the voice identification feature that is obtained through matching is updated by using the audio feature. If not, the audio feature is used as a voice identification feature, and a new user profile is created for the voice identification feature, that is, the voice identification feature is associated with a user profile of a corresponding user.

The user profile may comprise a set of user information related to a particular user, may be a set of audio features associated with the user or be a speech identification feature of the user, and other basic information of the user. An intelligent device may remind the user to input personal information (for example, a name, an age, and a payment account) of the user via speech, manual entry, or another manner, so as to manage a management relationship between the voice of the user and the identity and other personal information. In this way, the user can use various services via speech control.

The foregoing method is described in detail below with reference to an application scenario. The embodiments are merely exemplary, and do not constitute any limitation to this disclosure.

Figure 5:
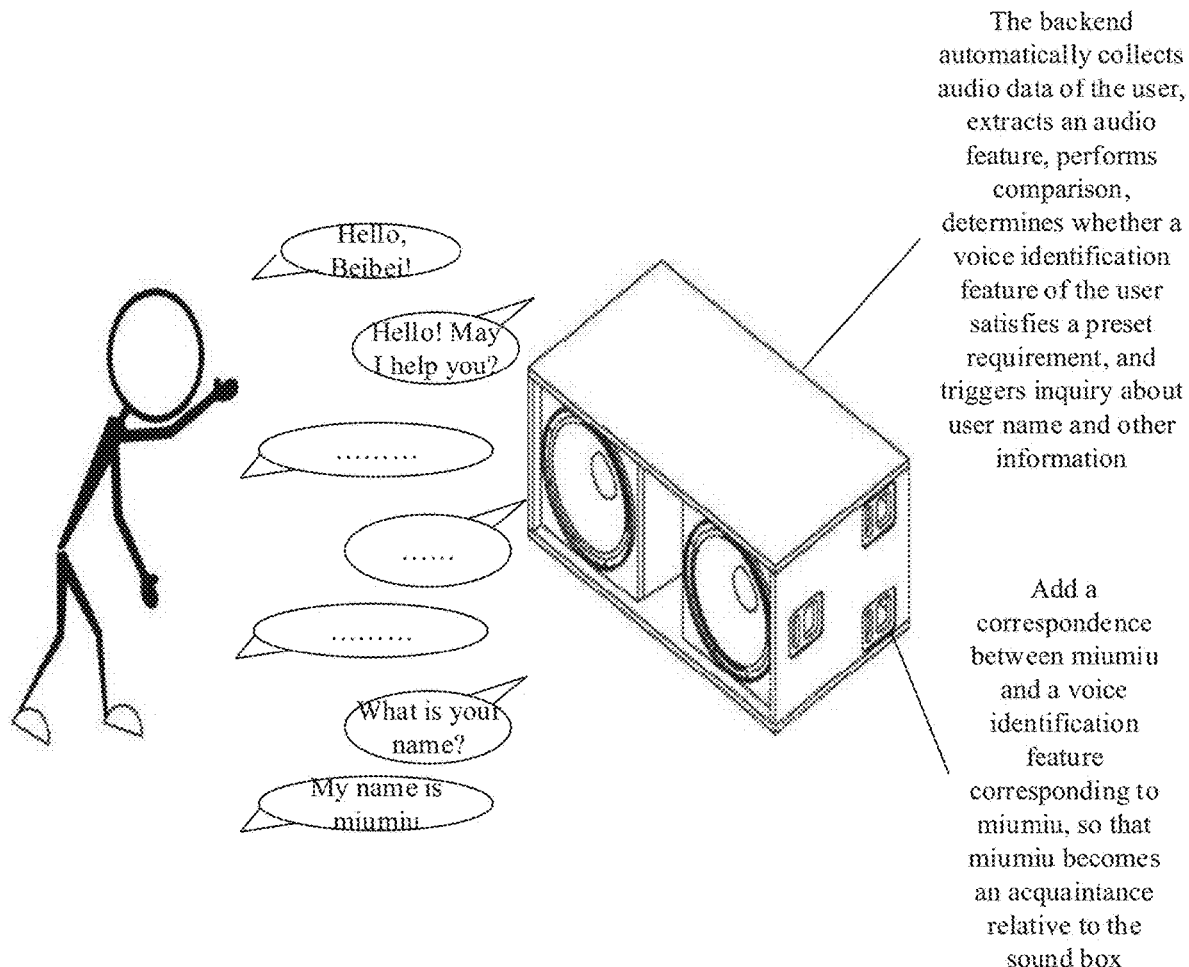
FIG. 5 is a schematic scenario diagram of an implementation scenario according to various embodiments of the present disclosure.

As shown in FIG. 5, a smart sound box may be installed at home, and the smart sound box may automatically and dynamically register information of a person at home. For example, a "wakeup keyword" may be set for the smart sound box. Each time a person speaks the wakeup keyword, the wakeup keyword is recorded as a piece of audio data, and moreover, interaction with the smart sound box is started. For example, the sound box is named "Beibei", and then "Hello, Beibei" may be used as the wakeup keyword. In this way, if the smart sound box identifies that a person speaks "Hello, Beibei," a dialog with the user may be automatically started, and moreover, the audio data of "Hello, Beibei" is recorded.

In this case, at the backend of the smart sound box, or on a server side, an audio feature in the audio data may be extracted, and then matching between the extracted audio feature and a voice identification feature of associated user information is performed. If a voice identification feature of the associated user information whose similarity with the audio feature exceeds a preset matching threshold exists, it indicates that the audio feature of the audio data and the voice identification feature of the associated user information are from the same person. Therefore, the voice identification feature that is obtained through matching may be updated by using the audio feature of the audio data. If a voice identification feature of the associated user information whose similarity with the audio feature reaches the preset matching threshold does not exist, whether a voice identification feature of unassociated user information whose similarity with the audio feature reaches the preset matching threshold exists may be further determined. If it is determined that a voice identification feature of the unassociated user information whose similarity with the audio feature reaches the preset matching threshold exists, the voice identification feature of the unassociated user information obtained through matching may be updated by using the audio feature. If no voice identification feature of the unassociated user information similar to the extracted audio feature exists, the audio feature may be recorded as a new voice identification feature of the unassociated user information. If a number of update times for a voice identification feature of the unassociated user information exceeds a preset threshold, the voice identification feature may be associated with user information, and used as a voice identification feature of the associated user information.

For selection of the wakeup keyword, distinguishable words infrequently encountered in normal chats may be selected. In the foregoing manner, the speech of the wakeup keyword is used as the audio data to update and optimize a voice identification feature library, and dynamically register a user, so that the smart sound box may recognize the user. Therefore, the user does not need to perform identity registration on purpose, thereby improving the user experience, and also making the sound box more intelligent. That is, at each time being used, the smart sound box records the audio data when the user speaks the wakeup keyword, and extracts and processes an audio feature by using a preset algorithm, so that after the user uses the smart sound box for a period of time, the smart sound box may recognize and identify the user.

In the foregoing scenario, the audio data when the user speaks the wakeup keyword is used as the audio data of the extracted audio feature. During an actual implementation, the speech when the user speaks the wakeup keyword may not be used as the audio data.

For example, after the user wakes up the smart sound box, in a conversation with the smart sound box, the smart sound box collects a dialog audio of the user as the audio data, and then optimizes the voice identification feature and dynamically registers the voice identification feature at the backend or on the server side.

Figure 6:
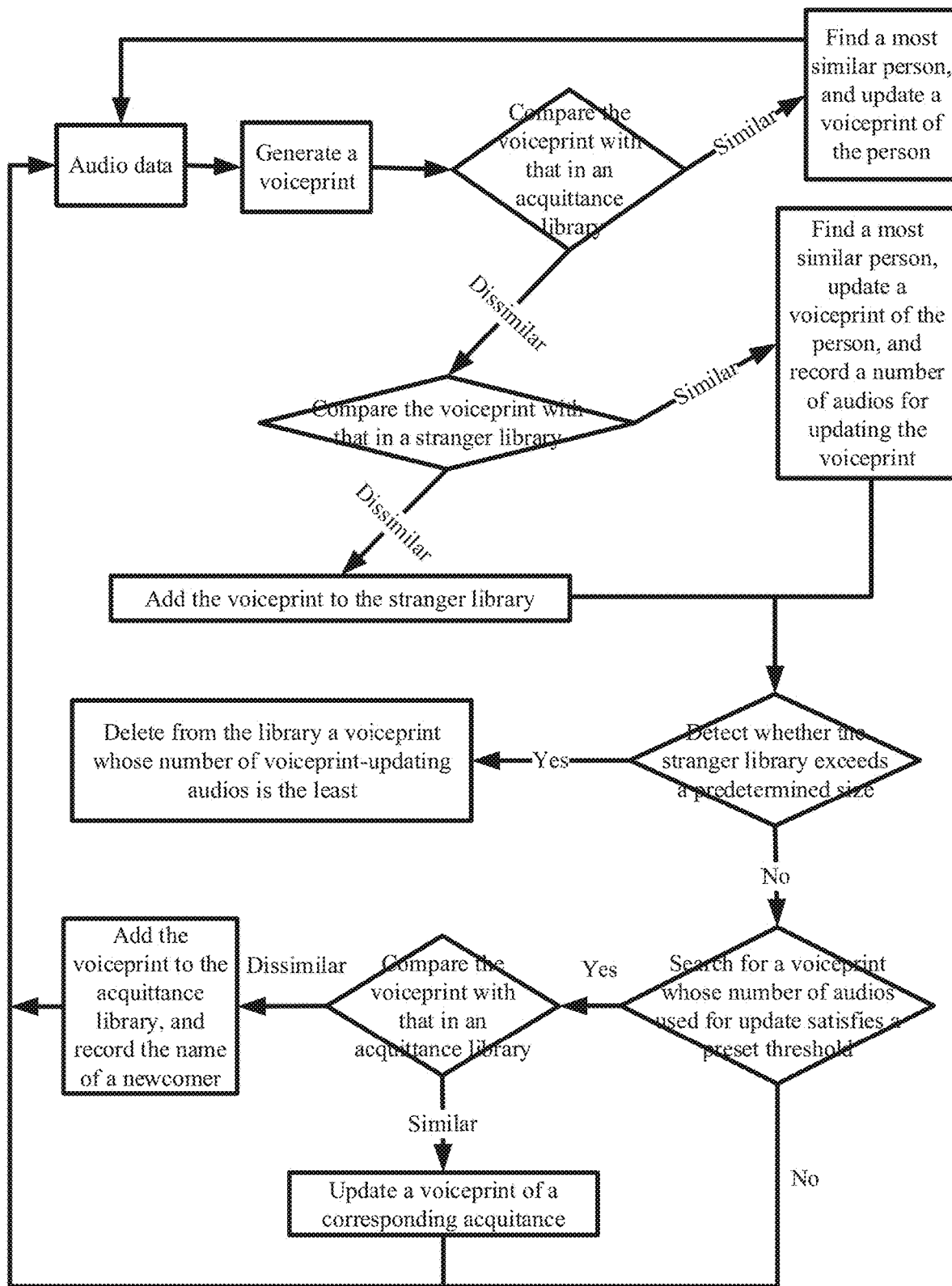
FIG. 6 is another flowchart of a data update method according to various embodiments of the present disclosure.

The execution process of the smart sound box may be shown in FIG. 6, and the smart sound box may set an acquaintance library (equivalent to the associated feature library) and a stranger library (the unassociated feature library).

After obtaining speech data, the smart sound box generates a voiceprint (that is, an extracted audio feature that may also be referred to as a voice identification feature), and the extracted voiceprint is compared with voiceprints in the acquaintance library. If there is a similar voiceprint, a most similar person is directly found, the voiceprint of the most similar person in the acquaintance library is updated by using the generated voiceprint. If the acquaintance library has no similar voiceprint, the extracted voiceprint is compared with voiceprints in the stranger library. If there are similar voiceprints, a most similar voiceprint is found, and the voiceprint is updated. Moreover, a number of audios for updating the voiceprint (voiceprint-updating audios) is recorded. If the stranger library also has no similar voiceprint, the generated voiceprint is added to the stranger library. Whether a number of voiceprints stored in the stranger library exceeds a preset threshold may be detected in real time or periodically. If yes, a voiceprint whose number of voiceprint-updating audios is the least may be deleted from the stranger library. Further, whether the stranger library has a voiceprint whose number of update times reaches a preset frequency threshold (for example, 10 times) may be further detected in real time or periodically. If yes, the voiceprint is compared with voiceprints in the acquaintance library, to determine whether a similar voiceprint exists. If yes, the similar voiceprint in the acquaintance library is updated by using the voiceprint. If not, the voiceprint is added to the acquaintance library, and user information corresponding to the voiceprint is recorded.

In some embodiments, as shown in FIG. 6, a voice identification method comprises: obtaining audio data, and extracting an audio feature of the audio data; determining whether a voice identification feature having a similarity with the audio feature above a preset matching threshold exists in an associated feature library; in response to determining that the voice identification feature exists in the associated feature library, updating, by using the audio feature, the voice identification feature; and in response to determining that the voice identification feature does not exist in the associated feature library, searching an unassociated feature library to determining if the voice identification feature having the similarity with the audio feature above the preset matching threshold exists in the unassociated feature library, wherein the associated feature library stores voice identification features of associated user information, and the unassociated feature library stores voice identification features of unassociated user information. In response to determining that the voice identification feature having the similarity with the audio feature above the preset matching threshold exists in the unassociated feature library, the voice identification feature may be updated by using the audio feature, and a number of audios for updating the voice identification feature may be updated. In response to determining that the voice identification feature having the similarity with the audio feature above the preset matching threshold does not exist in the unassociated feature library, the audio feature may be added as the voice identification feature to the unassociated feature library.

In some embodiments, the method further comprises: monitoring whether a number of the voice identification features of the unassociated user information exceeds a preset number; in response to determining that the number of the voice identification features of the unassociated user information does not exceed the preset number, searching the unassociated feature library to determine whether a number of audios for updating any of the voice identification features of the unassociated user information reaches a preset threshold; in response to determining that a number of audios for updating a first voice identification features of the unassociated user information reaches a preset threshold, comparing the first voice identification feature with the voice identification features in the associated feature library; in response to determining the first voice identification feature is dissimilar to the voice identification features in the associated feature library, adding the first voice identification feature to the associated feature library and record information of a user corresponding to the audio data; and in response to determining the first voice identification feature is similar to a second voice identification features in the associated feature library, updating, by using the first voice identification feature, the second voice identification feature.

The voiceprint library of the smart sound box may be stored locally, or may be stored on the cloud side, which is not limited in this disclosure.

In the application scenario, a household smart sound box is used as an example for description. During an implementation, update of the voiceprint library and automatic registration of the user may be further performed by using software in a mobile phone, a smart television, an intelligent robot, or the like similar to the foregoing manner of the smart sound box.

After the voiceprint library is established, an identity identification method can be performed. According to the identity identification method, an identity of a user may be determined according to an audio feature of an audio of the user.

In some embodiments, the user may first perform registration in the foregoing registration manner, and then obtain a voice identification feature of the user. The voice identification feature may be stored in a client, and may also be stored in a server. Correspondingly, the voice identification feature is associated with personal information of the user.

In some embodiments, when the identity of the user needs to be identified, audio information of a speech of the user may be recorded. For example, the user speaks a sentence to a microphone. In this case, the client obtains audio information of speech input of the user. According to the foregoing method for generating a speech feature vector, a speech feature vector is generated according to the audio information.

In some embodiments, matching between the speech feature vector and the voice identification feature is performed. When the matching is successful, personal information associated with the voice identification feature is used as identity information of the user. When performing matching between the speech feature vector and the voice identification feature, calculation may be performed according to the two, and when the two conform to a relationship, it may be considered that the matching is successful. For example, the difference between the speech feature vector and the voice identification feature can be summated, and an obtained value is used as a matching value to compare with a set threshold. If the matching value is less than or equal to the set threshold, it is considered that the matching between the speech feature vector and the voice identification feature is successful. Alternatively, the speech feature vector and the voice identification feature may be directly summated, and an obtained value is used as a matching value. If the matching value is greater than or equal to the set threshold, it is considered that the matching between the speech feature vector and the voice identification feature is successful.

This disclosure further provides a network interaction system. The network interaction system includes a client and a server.

In some embodiments, the client may comprise an electronic device having a sound recording function. According to different data processing capabilities of clients, the clients may be categorized into the following types.

TABLE 1

| Type number | Type name | Exemplary device | Data processing capability |
|---|---|---|---|
| 1 | Basic network device | Internet of Things device, edge node device | data collection and sending |
| 2 | Simple network device | Smart wearable device, POS (point of sale) machine | data collection and sending, simple data preprocessing |
| 3 | Intermediate network device | smart household appliance, smart sound box | data collection and sending, intermediate power consumption data preprocessing |
| 4 | Intelligent network device | Smartphone with good performance, tablet, computer | data collection and sending, high power consumption data pre-processing, data query matching |
| 5 | High-performance device | workstation, intelligent telephone stall | data collection and sending, data preprocessing, data query matching, data storage |

In some embodiments, a hardware device of the basic network device is relatively simple, and may perform sound recording by using a microphone, to generate audio information, and send the generated audio information to the server by using a network communications module. The basic network device may include the microphone, a network communications unit, a sensor, and a speaker. The basic network device may not need to process data. The basic network device may be further provided with another sensor, configured to collect an operating parameter of the basic network device. For example, the basic network device may be an Internet of Things device, an edge node device, or the like.

In some embodiments, the simple network device may include: a microphone, a network communications unit, a processor, a memory, a speaker, and the like. The simple network device has an enhanced data processing capability compared with the basic network device. The simple network device may have a processor that can process simple logic calculation, so that after collecting data, the simple network device may perform preliminary preprocessing on the data, for example, by generating a feature matrix according to audio information. The simple network device may have a display module that has a simple display function and that may be configured to feedback information to the user. For example, the simple network device may comprise a smart wearable device, a POS (point of sale) machine, or the like. For example, the simple network device may comprise a smart band, a relatively basic smart watch, smart glasses, a settlement device in an offline shopping place (for example, a POS machine), a mobile settlement device (for example, a handheld POS machine, or a settlement module appended to a handheld device), or the like.

In some embodiments, the intermediate network device may mainly include a microphone, a network communications unit, a processor, a memory, a display, a speaker, and the like. The dominant frequency of the processor of the intermediate network device may be less than 2.0 GHz, the memory capacity may be less than 2 GB, and the capacity of the memory may be less than 128 GB. The intermediate network device may process recorded audio information to some extent, for example, by generating a feature matrix, and perform endpoint detection processing, noise reduction processing, speech identification, and the like on the feature matrix. For example, the intermediate network device may include: an intelligent household appliance in smart home, an intelligent home terminal, a smart sound box, a relatively superior smart watch, a relatively basic smartphone (such as, at a price about 1000 yuan), and a vehicle-mounted intelligent terminal.

In some embodiments, the intelligent network device may include a hardware such as a microphone, a network communications unit, a processor, a memory, a display, and a speaker. The intelligent network device may have a relatively strong data processing capability. The dominant frequency of the processor of the intelligent network device may be greater than 2.0 GHz, the memory capacity may be less than 12 GB, and the capacity of the memory may be less than 1 TB. After generating a feature matrix for audio information, the intelligent network device may perform endpoint detection processing, noise reduction processing, speech identification, and the like. Further, the intelligent network device may further generate a speech feature vector according to the audio information. In some cases, matching between the speech feature vector and a voice identification feature may be performed, to identify the identity of the user. However, this matching is limited to a certain number of voice identification features such as voice identification features of family members in a family. For example, the intelligent network device may include: a smartphone with good performance, a tablet computer, a desktop computer, a notebook computer, and the like.

In some embodiments, the high-performance device may include hardware such as a microphone, a network communications unit, a processor, a memory, a display, and a speaker. The high-performance device may have a large-scale data calculation processing capability, and may further provide a powerful data storage capability. The dominant frequency of the processor of the high-performance device may be at least 3.0 GHz, the memory capacity may be greater than 12 GB, and the capacity of the memory may be at least 1 TB. The high-performance device may generate a feature matrix for audio information, perform endpoint detection processing, noise reduction processing, and speech identification, generate a speech feature vector, and perform matching between the speech feature vector and a large number of stored voice identification features. For example, the high-performance device may be a workstation, a desktop computer with quite high configuration, a Kiosk intelligent telephone stall, a self-service machine, or the like.

The foregoing lists some clients only by using examples. With advances of science and technology, performance of a hardware device may be improved, so that the foregoing electronic device that currently has a relatively weak data processing capability may also have a relatively strong processing capability. Therefore, the content in Table 1 is merely exemplary, and does not constitute a limitation.

The five types of hardware shown in Table 1 may all implement the foregoing dynamic registration method and update and optimization method for a voice identification feature, so as to dynamically register and optimize a voice identification feature. For processes of how the foregoing five types of hardware structures specifically dynamically register a voice identification feature and update and optimize a voice identification feature, the foregoing description of the dynamic registration method for a voice identification feature and the update method for a voice identification feature can be referred to, the details of which are not described herein again.

In some embodiments, the server may comprise an electronic device that has a calculation processing capability and that may have a network communications terminal, a processor, a memory, and the like. The server may also comprise software that is run in the electronic device. The server may comprise a distributed server, and may comprise a system having a plurality of processors, a memory, a network communications module, and the like that are in coordinated operation. Alternatively, the server may comprise a server cluster formed by several servers. In some embodiments, the server may be configured to manage a voice identification feature. After the user completes registration, a voice identification feature of the user may be stored in the server.

In one example, the client may be a household intelligent device that has a calculation capability to some extent, and may be, for example, the device of type 3 in Table 1. In a household scenario, the client may be manufactured as a smart sound box. The smart sound box may comprise a microphone, a speaker, a WiFi module, a memory, a processor, and the like. The smart sound box may implement an ordinary audio playback function, and is equipped with a processing device and a network device to implement a shopping function by conversing with the user and data exchange with the server.

In this example, the smart sound box may initiate a function by identifying a wakeup keyword. Before identifying the wakeup keyword spoken by the user, the smart sound box may be in a standby state. When using the smart sound box, the user may speak "hello, sound box." The smart sound box records the speech spoken by the user, and learns, through identification, that the content spoken the user is the wakeup keyword. In this case, the smart sound box may reply, by using the speaker, to the user with "hello, do you need help?"

In this example, the user may intend to buy an air purifier. The user may say: "I want to buy an air purifier. Do you have any recommendation?" After generating audio information by sound recording of the microphone, the smart sound box identifies description information of the foregoing product, queries a product information set in the memory for product information of air purifiers, to obtain two recommendation results, and plays a speech: "I have two recommendations, the first one is the Xiaomi air purifier generation 2, and the second one is the Midea KJ210G-C46 air purifier" by using the speaker. The user may say: "I want to buy the Xiaomi air purifier generation 2." After by recording and identifying the audio information, the smart sound box determines that information about the product to be bought is the Xiaomi air purifier generation 2. The smart sound box may also send the product description information to the server, and receive a recommendation result provided by the server.

In this example, the smart sound box may inquire the user about "do you want to pay for purchase now?" and the user may reply with "yes." The smart sound box may generate a text according to a preset random algorithm, and inform the user of "please repeat this segment of digits 57463 once." The smart sound box may identify whether the content spoken by the user is the designated digits, so as to determine whether the user has a real payment intention. If the user says: "Forget it, I will not buy," the smart sound box may end this purchase process. If the user says: "57463," the smart sound box determines that the speech spoken by the user matches with the designated digits, and determines that the user intended to make the purchase.

In this example, the smart sound box may generate an audio feature according to audio information of the digits repeated by the user, and perform matching between the audio feature and a voice identification feature of the user stored in the memory of the smart sound box. The voice identification feature is registered during dynamic registration in the above example, so that the smart sound box has the voice identification feature of the user.

In this example, the smart sound box may perform matching between the stored voice identification feature and the audio feature successfully. In this case, the smart sound box completes the identity verification of the user, and may send personal information of the user and information about the product to be bought to the server, so that the server pays the price in the product information to a vendor of the product from a financial account of the user.

In one example, the smart sound box may actively predict a product or a service that the user follows.

In this example, the smart sound box may be located in a living room at home of the user. When the user is watching television, the smart sound box may obtain audio information by performing sound recording on a television voice, and then identify the audio information to obtain a channel code. Alternatively, the smart sound box may interact with the server by identifying content of a television program, and the server feeds back a corresponding television channel code.

In this example, the smart sound box may store a program list of a television channel, or may obtain a program list of a television channel from the server. When the user is watching television, the user may be interested in a product shown in a television advertisement, and want to buy the product. In this case, the user may say, "hello, sound box," "I want to buy the product in this advertisement." The smart sound box may determine, according to a time point at which the user speaks and a time point provided in the program list, information about the product that the user wants to buy. Further, the smart sound box may extract an audio feature according to audio data of the user, and perform matching between the audio feature and a voice identification feature in an established voice identification feature library, to verify the identity of the user. When the verification is successful, personal information of the user and the product information are sent to the server, so that the server pays the price in the product information to a vendor of the product from a financial account of the user.

Figure 7:
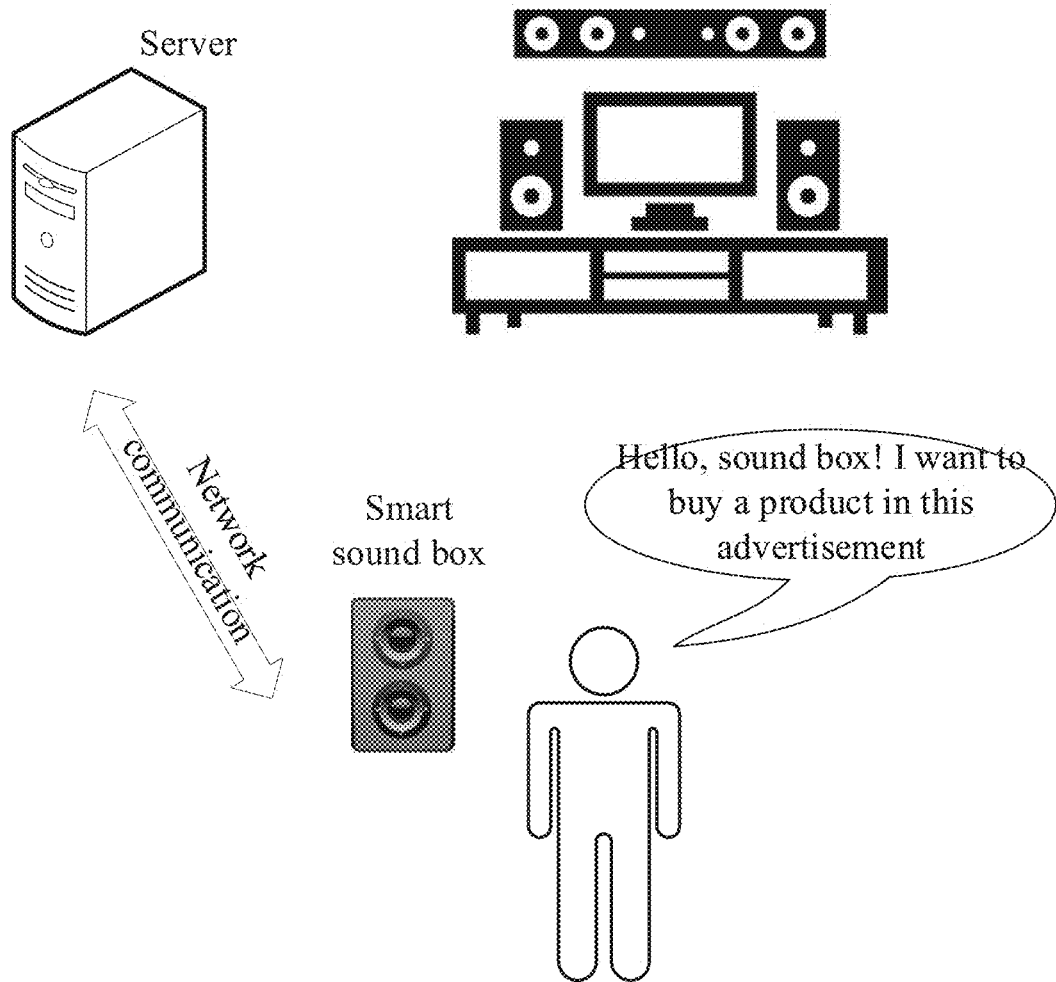
FIG. 7 is a schematic diagram of an application scenario of a payment method according to various embodiments of the present disclosure.

In one example, as shown in FIG. 7, the smart sound box may actively predict a product or a service that the user follows.

In this example, the smart sound box may be located in a living room at home of the user. When the user is watching television, the smart sound box may obtain audio information by performing sound recording on a television voice, and then identify the audio information to obtain a channel code. Alternatively, the smart sound box may interact with the server by identifying content of a television program, and the server feeds back a corresponding television channel code.

In this example, the smart sound box may store a program list of a television channel, or may obtain a program list of a television channel from the server. When the user is watching television, the user may be interested in a product shown in a television advertisement, and want to buy the product. In this case, the user may say, "hello, sound box," "I want to buy the product in this advertisement." The smart sound box may determine, according to a time point at which the user speaks and a time point provided in the program list, information about the product that the user wants to buy. Further, the smart sound box may obtain, through matching, the voice identification feature according to the audio feature of the user audio, so as to verify the identity of the user. When the verification is successful, personal information of the user and the product information are sent to the server, so that the server pays the price in the product information to a vendor of the product from a financial account of the user.

Figure 8:
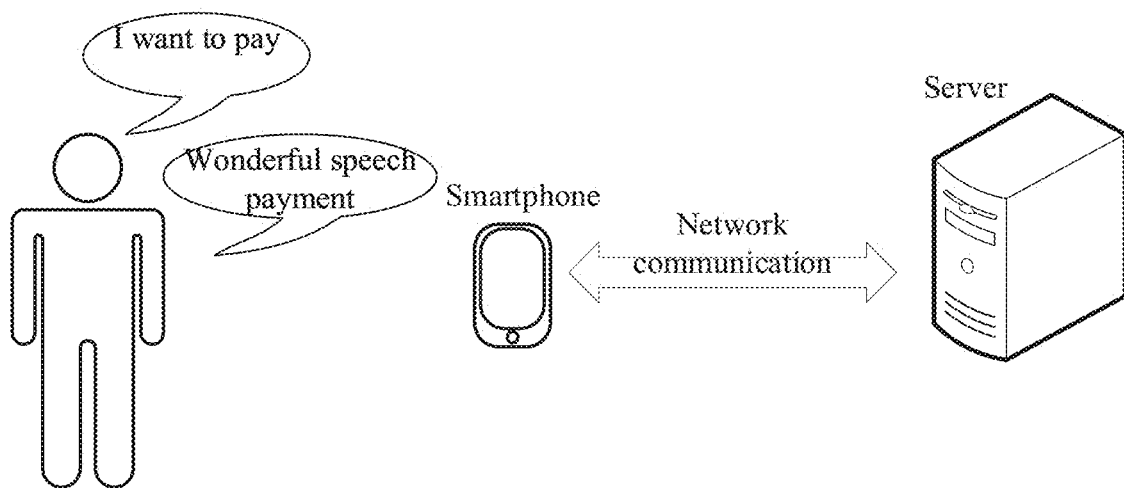
FIG. 8 is a schematic diagram of an application scenario of a payment method according to various embodiments of the present disclosure.

In one example, as shown in FIG. 8, the client may comprise an electronic device that has a display, and may be, for example, the device of type 4 in Table 1. For example, the client may be a smartphone.

In this example, the user may intend to buy a headset. The user may use shopping software such as mobile JD, Dangdang, or Amazon shopping software, to operate and browse product information.

In this example, when the user is about to pay for a headset at a price of 150 yuan after browsing the product information, the user may let mobile phone display stay at the product information, and speak to the mobile phone: "I want to pay." In this case, the mobile phone may record the audio and identify the audio to obtain an instruction of the user, and then the mobile phone may provide a payment interface to the user. Alternatively, the user clicks a payment button, and the mobile phone provides a payment interface. The user may directly speak a preset payment keyword on the payment interface. For example, the user speaks: "voiceprint payment makes life convenient," and the mobile phone performs sound recording to generate audio information, and may generate an audio feature according to the audio information. Matching between the audio feature and a voice identification feature stored in the mobile phone is performed, so as to verify the identity of the user. When the matching is successful, the mobile phone may send personal information of the user and the product information to the server, so that the server pays the price in the product information to a vendor of the product from a financial account of the user.

Figure 9:
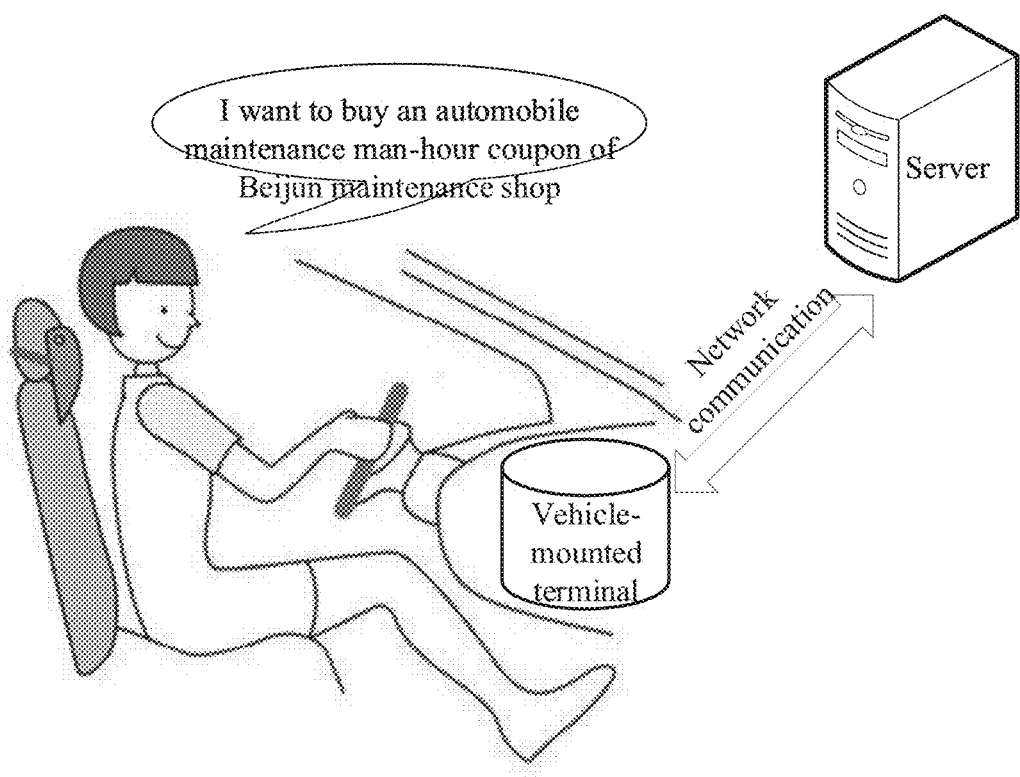
FIG. 9 is a schematic diagram of an application scenario of a payment method according to various embodiments of the present disclosure.

In one example, as shown in FIG. 9, the client may comprise a vehicle-mounted terminal. The vehicle-mounted terminal may determine, by conversing with a user and further processing, that the user wants to buy a service coupon such as an automobile maintenance coupon at a selling price of 50 yuan. The vehicle-mounted terminal may send a recorded speech file of the user and information about the automobile maintenance coupon together to a server. The server performs an identity verification process.

In this example, audio information provided by the vehicle-mounted terminal to the server may be a recorded sound of purchase instruction sent by the user. For example, the user says: "I want to buy an automobile maintenance coupon of Beijun maintenance shop," and the vehicle-mounted terminal sends audio data of the sentence to the server.

In this example, after receiving the audio data and service information, the server may extract an audio feature according to the audio data, and then perform matching between the audio feature and a voice identification feature in the server, so as to verify the identity of the user. For example, when the verification is successful, personal information of the user is obtained according to a voice identification feature on which matching is performed successfully, and then a financial account of the personal information may pay Beijun maintenance shop to buy an automobile maintenance coupon.

In this example, after recording audio data, the vehicle-mounted terminal generates an audio feature, and sends the audio feature and service information to the server. Then, it is convenient for the server to perform matching between the audio feature and a voice identification feature, so as to verify the user identity.

Figure 10:
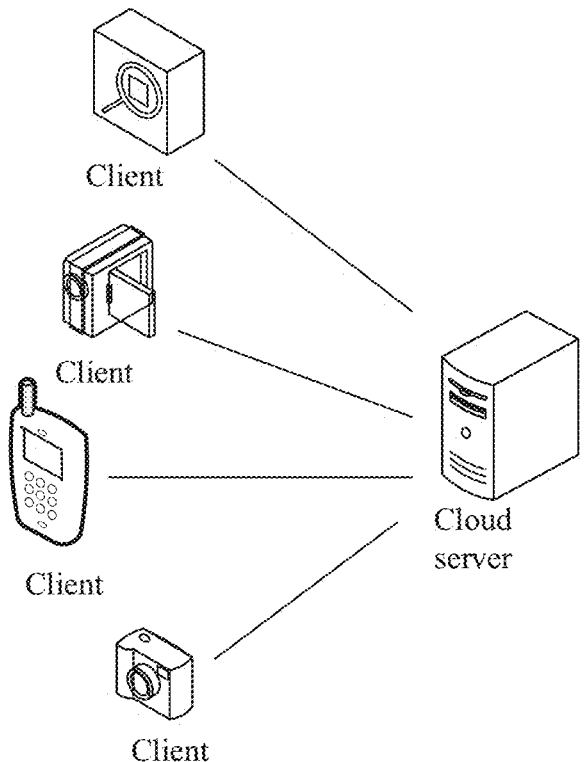
FIG. 10 is a schematic architectural diagram of a data update system according to various embodiments of the present disclosure.

Description is performed below with reference to another application scenario. In this example, as shown in FIG. 10, the application scenario includes: a plurality of clients and a cloud server. A client obtains audio data, and extracts an audio feature as a voiceprint, and matching between the voiceprint and a voiceprint that is stored in the cloud server is performed, so as to update a voiceprint library shared by the plurality of clients on a cloud side. Alternatively, after obtaining audio data, a client directly sends the audio data to the cloud server, and the cloud server processes the audio data to extract a voiceprint, and updates the voiceprint library by using the extracted voiceprint. Alternatively, for the plurality of clients, data of some clients is shared on the cloud side, and some clients maintain their own voiceprint libraries. Only when matching on user information needs to be performed, the user information is obtained from the cloud side. If user information of a similar voiceprint cannot be obtained from the cloud side, the user information is requested from a user.

In some embodiments, the client may be an electronic device having a sound recording function. For example, the client may be a desktop computer, a tablet computer, a notebook computer, a smartphone, a digital assistant, a smart wearable device, a shopping guide terminal, a television set, a smart sound box, a microphone, or the like. The smart wearable device includes but is not limited to a smart band, a smart watch, smart glasses, a smart helmet, a smart necklace, or the like. Alternatively, the client may comprise software that can be run in the electronic device. For example, the electronic device provides a sound recording function, and the software may record the audio data by invoking the sound recording function.

Figure 11:
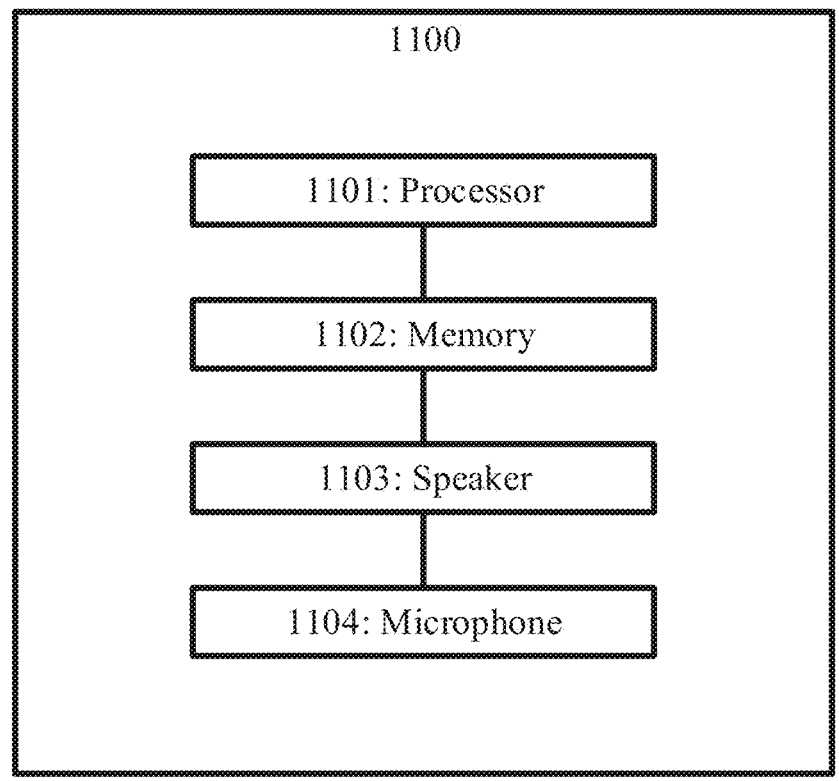
FIG. 11 is a block diagram of a voice identification system according to various embodiments of the present disclosure.
Figure 12:
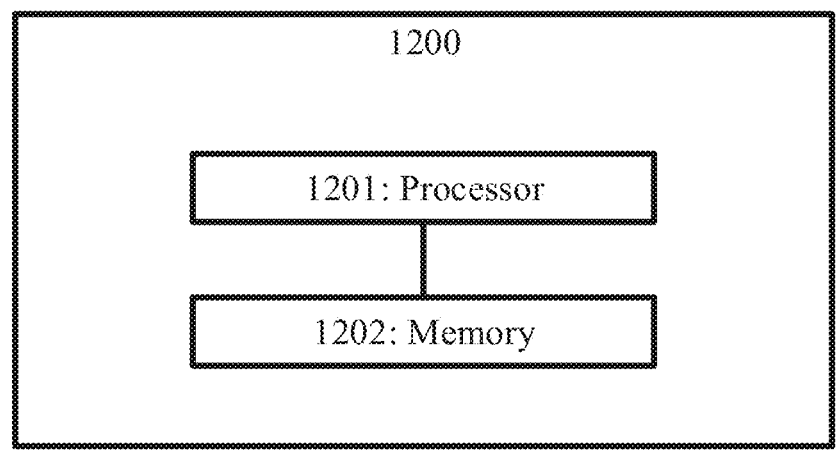
FIG. 12 is a block diagram of a voice identification system according to various embodiments of the present disclosure.

Corresponding to the above methods, voice identification systems (e.g., server, client) are disclosed. As shown in FIG. 11, an exemplary voice identification system 1100 (e.g., a client such as a sound box, a mobile phone) may comprise a processor 1101, a memory 1102, an optional speaker 1103, and a microphone 1104. The memory 1102 may be non-transitory and computer-readable and store instructions that, when executed by the processor 1101, cause the system 1100 to perform various methods and steps described herein. As shown in FIG. 12, an exemplary voice identification system 1200 (e.g., a server) may comprise a processor 1201 and a memory 1202. The memory 1202 may be non-transitory and computer-readable and store instructions that, when executed by the processor 1201, cause the system 1200 to perform various methods and steps described herein. More details are provided below with respect to the client and the server.

In some embodiments, the voice identification system comprises a microphone configured to obtain audio data; and a processor and a non-transitory computer-readable storage medium storing instructions that, when executed by the processor, cause the system to perform a voice identification method, the method comprising: extracting an audio feature of the audio data; determining whether a voice identification feature having a similarity with the audio feature above a preset matching threshold exists in an associated feature library; and in response to determining that the voice identification feature exists in the associated feature library, updating, by using the audio feature, the voice identification feature.

In some embodiments, the client includes: a microphone unit, a memory, and a processor. The microphone unit is configured to obtain audio data; the processor is configured to determine whether a number of audios for updating a voice identification feature reaches a preset threshold; and associate user information with the voice identification feature if it is determined that the number of the audios for updating the voice identification feature reaches the preset threshold; and the memory is configured to store the voice identification feature and the associated user information.

In some embodiments, the client includes: a processor and a memory. The processor is configured to obtain audio data, and extract an audio feature of the audio data; determine whether a voice identification feature whose similarity with the audio feature reaches a preset matching threshold exists in an associated feature library, where the associated feature library is used to store a voice identification feature of associated user information; and update, by using the audio feature, a voice identification feature obtained through matching if it is determined that such voice identification feature exists; and add the audio feature to an unassociated feature library if it is determined that such voice identification feature does not exist, where the unassociated feature library is used to store a voice identification feature of unassociated user information; and the memory is configured to store the associated feature library and the unassociated feature library.

In some embodiments, the processor may be configured to acquire the audio feature and the voice identification feature obtained through matching; generate a first identification feature according to the audio feature and the voice identification feature that is obtained through matching; and replace the voice identification feature obtained through matching with the first identification feature, and store the first identification feature in the associated feature library.

In some embodiments, the processor may be configured to update, by using the audio feature if a voice identification feature whose similarity with the audio feature reaches the preset matching threshold exists in the unassociated feature library, a voice identification feature obtained through matching, and update a number of audios for updating the voice identification feature; and adding, if a voice identification feature whose similarity with the audio feature reaches the preset matching threshold does not exist in the unassociated feature library, the audio feature serving as a voice identification feature to the unassociated feature library.

In some embodiments, the audio data may include but is not limited to an audio file obtained by recording a voice of a user who speaks a wakeup keyword.

In some embodiments, the server includes a processor and a memory. The processor is configured to obtain audio data, and extract an audio feature of the audio data; determine whether a voice identification feature whose similarity with the audio feature reaches a preset matching threshold exists in an associated feature library, where the associated feature library is used to store a voice identification feature of associated user information; and update, by using the audio feature, a voice identification feature obtained through matching if it is determined that such voice identification feature exists; and add the audio feature to an unassociated feature library if it is determined that such voice identification feature does not exist, where the unassociated feature library is used to store a voice identification feature of unassociated user information; and the memory is configured to store the associated feature library and the unassociated feature library.

In some embodiments, the client includes a processor, where the processor is configured to perform the following steps: determining whether a number of audios for updating a voice identification feature reaches a preset threshold; and associating user information with the voice identification feature if it is determined that the number of audios for updating the voice identification feature reaches the preset threshold.

In some embodiments, the processor may be further configured to obtain audio data before the determining whether a number of audios for updating a voice identification feature reaches a preset threshold; extract an audio feature of the audio data; determine whether a voice identification feature of associated user information whose similarity with the audio feature reaches a preset matching threshold exists; and update, by using the audio feature if it is determined that such voice identification feature exists, a voice identification feature of associated user information obtained through matching.

In some embodiments, the processor may be further configured to: after the determining whether a voice identification feature of associated user information whose similarity with the audio feature reaches a preset matching threshold exists, determine, if it is determined that a voice identification feature of associated user information whose similarity with the audio feature reaches the preset matching threshold does not exist, whether a voice identification feature of unassociated user information whose similarity with the audio feature reaches the preset matching threshold exists; update, by using the audio feature if it is determined that a voice identification feature of unassociated user information whose similarity with the audio feature reaches the preset matching threshold exists, a voice identification feature of unassociated user information obtained through matching; and determine whether a number of audios for updating the voice identification feature of the unassociated user information obtained through matching reaches the preset threshold.

In some embodiments, the processor may be configured to update, by using the audio feature if it is determined that a plurality of voice identification features of the associated user information whose similarities with the audio feature reach the preset matching threshold exists, a voice identification feature of the associated user information having the highest similarity with the audio feature.

In some embodiments, the processor may be further configured to monitor whether a number of voice identification features of unassociated user information exceeds a preset number; and delete, if it is determined that the number exceeds the preset number, one or more voice identification features that are of the voice identification features of the unassociated user information having the least amount of audio data for updating the one or more voice identification features.

In some embodiments, the processor may be further configured to monitor whether a number of voice identification features of unassociated user information exceeds a preset number; and delete, if it is determined that the number exceeds the preset number, one or more voice identification features of the unassociated user information having the earliest update time.

In some embodiments, the processor may be further configured to generate a request used to request user information; receive user information returned in response to the request; and associate the received user information with the voice identification feature.

This disclosure further provides a server that may include a processor, where the processor is configured to perform the following steps: determining whether a number of audios for updating a voice identification feature reaches a preset threshold; and associating user information with the voice identification feature if it is determined that the number of the audios for updating the voice identification feature reaches the preset threshold.

In some embodiments, the foregoing memory may include but is not limited to a random access memory (RAM), a read-only memory (ROM), a cache, a hard disk drive (HDD), or a memory card. The memory may be configured to store computer program instructions. A network communications unit may be an interface that is set according to a standard specified by a communication protocol and that is configured to perform network connection and communication.

In some embodiments, the foregoing processor may be implemented in any proper manner. For example, the processor may be in a form such as a microprocessor, a processor, a computer readable medium storing computer readable program code (such as software or firmware) that can be executed by the processor (microprocessor), a logic gate, a switch, an application-specific integrated circuit (ASIC), a programmable logic controller, or an embedded microcontroller.

In some embodiments, the foregoing microphone unit may convert a voice into an electric signal to form an audio file. The microphone unit may be in a form of a resistive microphone, an inductive microphone, a capacitive microphone, a ribbon microphone, a moving-coil microphone, or an electret microphone.

For functions and effects implemented by the client and the server provided in this implementation, corresponding explanations in other implementations can be referred to.

This disclosure further provides a computer storage medium, storing program instructions. When being executed, the program instructions implements: obtaining audio data, and extracting an audio feature of the audio data; determining whether a voice identification feature whose similarity with the audio feature reaches a preset matching threshold exists in an associated feature library, where the associated feature library is used to store a voice identification feature of associated user information; and updating, by using the audio feature, a voice identification feature obtained through matching if it is determined that such voice identification feature exists; and adding the audio feature to an unassociated feature library if it is determined that such voice identification feature does not exist, where the unassociated feature library is used to store a voice identification feature of unassociated user information.

In some embodiments, the computer storage medium includes but is not limited to a random access memory (RAM), a read-only memory (ROM), a cache, a hard disk drive (HDD), or a memory card.

For functions and effects implemented when the program instructions of the computer storage medium provided in this implementation are executed, corresponding explanations in other implementations can be referred to.

The disclosure is described in a progressive manner, references may be made between the same and similar parts of the implementations, and what is emphasized in the description of each implementation focuses on the part different from another part of other implementations.

For the server, in the nineties of the 20th century, whether a technical improvement is an improvement in hardware (for example, an improvement in a circuit structure such as a diode, a transistor, or a switch) or an improvement in software (an improvement in a method process) may be quite obviously distinguished. However, with development of technologies, many current improvements in method processes may be considered as direct improvements in hardware circuit structures. Almost all designers obtain a corresponding hardware circuit structure by programming an improved method process into a hardware circuit. Therefore, an improvement in a method process may be implemented by using a hardware entity module. For example, a programmable logic device (PLD) (such as a field programmable gate array (FPGA)) is such an integrated circuit, and a logic function thereof is determined by programming a device by a user. A designer performs programming to "integrate" a digital system on a PLD, and a chip manufacturer does not need to be invited to design and manufacture a dedicated integrated circuit chip. Moreover, currently, in place of manually manufacturing an integrated circuit chip, this programming is also mostly implemented by using "logic compiler" software. The software is similar to a software compiler used at the time of program development and writing, and original code before compilation also needs to be written by using a particular programming language that is referred to as a hardware description language (HDL). There is a plurality of HDLs rather than only one HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, VHDL (Very-High-Speed Integrated Circuit Hardware Description Language) and Verilog2 are used most generally. A person skilled in the art should also clearly know that, as long as a method process is slightly logically programmed by using the foregoing several hardware description languages and programmed into an integrated circuit, a hardware circuit for implementing the logic method process may be obtained quite easily.

A person skilled in the art also knows that, in addition to implementing a controller in a pure computer readable program code manner, it is completely feasible to logically program method steps to enable the controller to implement the same function in a form of a logic gate, a switch, an application-specific integrated circuit, a programmable logic controller, an embedded microcontroller, or the like. Therefore, this controller may be considered as a hardware component, and an apparatus that is included in the controller and that is configured to implement various functions may also be considered as a structure in the hardware component. Alternatively, an apparatus configured to implement various functions may even be considered as both a software module that may implement a method and a structure in the hardware component.

A person skilled in the art may understand that this disclosure may be implemented by hardware only or by software and a necessary universal hardware platform. Based on such understandings, the technical solution under this disclosure or the part that makes contributions to the prior art may be essentially embodied in the form of a software product. The software product may be stored in a storage medium such as a ROM/RAM, a magnetic disk, or an optical disc. The software product includes several instructions that enable a computer device (a personal computer, a server, or a network device) to execute the methods provided in the implementations of this disclosure.

Although this disclosure is described by using the implementations, a person of ordinary skill in the art knows that, this disclosure has many transformations and changes without departing from the spirit of this disclosure, and it is intended that the appended claims include these transformations and changes without departing from the spirit of this disclosure.

What is claimed is:

1. A voice identification method, comprising:
   obtaining audio data, and extracting an audio feature of the audio data;
   determining whether a voice identification feature having a similarity with the audio feature above a preset matching threshold exists in an associated feature library;
   in response to determining that the voice identification feature exists in the associated feature library, updating, by using the audio feature, the voice identification feature;
   in response to determining that the voice identification feature does not exist in the associated feature library, determining whether a number of audio files for updating the voice identification feature reaches a preset threshold; and
   associating user information with the voice identification feature in response to determining that the number of the audio files for updating the voice identification feature reaches the preset threshold.

2. The method according to claim 1, wherein the updating, by using the audio feature, the voice identification feature comprises:
   generating a first identification feature according to the audio feature and the voice identification feature; and
   replacing the voice identification feature with the first identification feature, and storing the first identification feature in the associated feature library.

3. The method according to claim 1, wherein the in response to determining that the voice identification feature exists in the associated feature library, updating, by using the audio feature, the voice identification feature comprises:
   in response to determining that a plurality of the voice identification features of the associated user information having similarities with the audio feature above the preset matching threshold exist in the associated feature library, updating, by using the audio feature, the voice identification feature of the associated user information having the highest similarity with the audio feature.

4. The method according to claim 1, wherein the audio data comprises an audio recording of a wakeup keyword spoken by a user.

5. The method of claim 1, further comprising:
in response to determining that the voice identification feature does not exist in the associated feature library, searching an unassociated feature library to determine if the voice identification feature having the similarity with the audio feature above the preset matching threshold exists in the unassociated feature library, wherein the associated feature library stores voice identification features of associated user information, and the unassociated feature library stores voice identification features of unassociated user information.

6. The method according to claim 5, wherein:
the associated feature library further stores user information associated with the voice identification feature of the associated user information; and
the unassociated feature library further stores a number of audio files for updating the voice identification feature of the unassociated user information.

7. The method according to claim 5, further comprising:
in response to determining that the voice identification feature having the similarity with the audio feature above the preset matching threshold exists in the unassociated feature library, updating, by using the audio feature, the voice identification feature; and
in response to determining that the voice identification feature having the similarity with the audio feature above the preset matching threshold does not exist in the unassociated feature library, adding the audio feature as the voice identification feature to the unassociated feature library.

8. The method according to claim 7, further comprising:
monitoring whether a number of the voice identification features of the unassociated user information exceeds a preset number; and
in response to determining that the number of the voice identification features of the unassociated user information exceeds the preset number, deleting one or more of the voice identification features of the unassociated user information having the least amount of audio data for updating the one or more voice identification features.

9. The method according to claim 7, further comprising:
monitoring whether a number of the voice identification features of the unassociated user information exceeds a preset number; and
in response to determining that the number of the voice identification features of the unassociated user information exceeds the preset number, deleting one or more of the voice identification features of the unassociated user information having the earliest update time.

10. The method according to claim 7, further comprising:
monitoring whether a number of the voice identification features of the unassociated user information exceeds a preset number;
in response to determining that the number of the voice identification features of the unassociated user information does not exceed the preset number, searching the unassociated feature library to determine whether a number of audio files for updating any of the voice identification features of the unassociated user information reaches a preset threshold;
in response to determining that a number of audio files for updating a first voice identification features of the unassociated user information reaches a preset threshold, comparing the first voice identification feature with the voice identification features in the associated feature library;
in response to determining the first voice identification feature is dissimilar to the voice identification features in the associated feature library, adding the first voice identification feature to the associated feature library and record information of a user corresponding to the audio data; and
in response to determining the first voice identification feature is similar to a second voice identification features in the associated feature library, updating, by using the first voice identification feature, the second voice identification feature.

11. A non-transitory computer-readable storage medium storing instructions that, when executed by a processor, cause the processor to perform a voice identification method, the method comprising:
extracting an audio feature of audio data;
determining whether a voice identification feature having a similarity with the audio feature above a preset matching threshold exists in an associated feature library;
in response to determining that the voice identification feature exists in the associated feature library, updating, by using the audio feature, the voice identification feature;
in response to determining that the voice identification feature does not exist in the associated feature library, searching an unassociated feature library to determine if the voice identification feature having the similarity with the audio feature above the preset matching threshold exists in the unassociated feature library, wherein the associated feature library stores voice identification features of associated user information, and the unassociated feature library stores voice identification features of unassociated user information;
monitoring whether a number of the voice identification features of the unassociated user information exceeds a preset number;
in response to determining that the number of the voice identification features of the unassociated user information does not exceed the preset number, searching the unassociated feature library to determine whether a number of audio files for updating any of the voice identification features of the unassociated user information reaches a preset threshold;
in response to determining that a number of audio files for updating a first voice identification features of the unassociated user information reaches a preset threshold, comparing the first voice identification feature with the voice identification features in the associated feature library;
in response to determining the first voice identification feature is dissimilar to the voice identification features in the associated feature library, adding the first voice identification feature to the associated feature library and record information of a user corresponding to the audio data; and
in response to determining the first voice identification feature is similar to a second voice identification features in the associated feature library, updating, by using the first voice identification feature, the second voice identification feature.

12. The non-transitory computer-readable storage medium according to claim 11, wherein the in response to determining that the voice identification feature exists in the associated feature library, updating, by using the audio feature, the voice identification feature comprises:
   in response to determining that a plurality of the voice identification features of the associated user information having similarities with the audio feature above the preset matching threshold exist in the associated feature library, updating, by using the audio feature, the voice identification feature of the associated user information having the highest similarity with the audio feature.

13. The non-transitory computer-readable storage medium according to claim 11, wherein the method further comprises:
   in response to determining that the voice identification feature having the similarity with the audio feature above the preset matching threshold exists in the unassociated feature library, updating, by using the audio feature, the voice identification feature; and
   in response to determining that the voice identification feature having the similarity with the audio feature above the preset matching threshold does not exist in the unassociated feature library, adding the audio feature as the voice identification feature to the unassociated feature library.

14. A voice identification system, comprising:
   a microphone configured to obtain audio data; and
   a processor and a non-transitory computer-readable storage medium storing instructions that, when executed by the processor, cause the system to perform a voice identification method, the method comprising:
   extracting an audio feature of the audio data;
   determining whether a voice identification feature having a similarity with the audio feature above a preset matching threshold exists in an associated feature library;
   in response to determining that the voice identification feature exists in the associated feature library, updating, by using the audio feature, the voice identification feature;
   in response to determining that the voice identification feature does not exist in the associated feature library, searching an unassociated feature library to determine if the voice identification feature having the similarity with the audio feature above the preset matching threshold exists in the unassociated feature library, wherein the associated feature library stores voice identification features of associated user information, and the unassociated feature library stores voice identification features of unassociated user information;
   monitoring whether a number of the voice identification features of the unassociated user information exceeds a preset number; and
   in response to determining that the number of the voice identification features of the unassociated user information exceeds the preset number, deleting one or more of the voice identification features of the unassociated user information having a least amount of audio data for updating the one or more voice identification features.

15. The voice identification system according to claim 14, wherein the in response to determining that the voice identification feature exists in the associated feature library, updating, by using the audio feature, the voice identification feature comprises:
   in response to determining that a plurality of the voice identification features of the associated user information having similarities with the audio feature above the preset matching threshold exist in the associated feature library, updating, by using the audio feature, the voice identification feature of the associated user information having the highest similarity with the audio feature.

16. The voice identification system according to claim 14, wherein the method further comprises:
   in response to determining that the voice identification feature having the similarity with the audio feature above the preset matching threshold exists in the unassociated feature library, updating, by using the audio feature, the voice identification feature; and
   in response to determining that the voice identification feature having the similarity with the audio feature above the preset matching threshold does not exist in the unassociated feature library, adding the audio feature as the voice identification feature to the unassociated feature library.

* * * * *